United States Patent
Yoshizawa et al.

(10) Patent No.: US 8,940,449 B2
(45) Date of Patent: Jan. 27, 2015

(54) FUEL CELL

(75) Inventors: Atsuhito Yoshizawa, Yokohama (JP); Kentaro Nagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1103 days.

(21) Appl. No.: 12/161,853

(22) PCT Filed: Feb. 1, 2007

(86) PCT No.: PCT/JP2007/052156
§ 371 (c)(1),
(2), (4) Date: Jul. 23, 2008

(87) PCT Pub. No.: WO2007/089029
PCT Pub. Date: Aug. 9, 2007

(65) Prior Publication Data
US 2009/0029220 A1     Jan. 29, 2009

(30) Foreign Application Priority Data
Feb. 3, 2006  (JP) .................................. 2006-027793

(51) Int. Cl.
*H01M 8/10* (2006.01)
*H01M 8/02* (2006.01)
(Continued)

(52) U.S. Cl.
CPC ............ *H01M 8/023* (2013.01); *H01M 4/8605* (2013.01); *H01M 8/04171* (2013.01); *H01M 8/1002* (2013.01); *H01M 4/861* (2013.01);
(Continued)

(58) Field of Classification Search
USPC ....................................................... 429/453
See application file for complete search history.

(56) References Cited

U.S. PATENT DOCUMENTS 6,423,437 B1    7/2002 Kenyon et al.
6,451,470 B1 *  9/2002 Koschany et al. ............ 429/414
(Continued)

FOREIGN PATENT DOCUMENTS

EP    1 176 654 A2    1/2002
JP    59-56362 A      3/1984
(Continued)

OTHER PUBLICATIONS

Office Action in Canadian Application No. 2,640,726 (Oct. 28, 2011).
(Continued)

*Primary Examiner* — Ula C. Ruddock
*Assistant Examiner* — Jacob Marks
(74) *Attorney, Agent, or Firm* — Fitzpatrick, Cella, Harper & Scinto

(57) ABSTRACT

A fuel cell including an electrolyte film, a catalyst layer, two diffusion layers, a fuel supply layer, an oxygen supply layer, a water-absorbing layer, and a collector. The fuel cell has an opening at least in a part of a side surface parallel to a proton conduction direction of the electrolyte film among side surfaces of the fuel cell. The water-absorbing layer is present between the oxygen supply layer and the collector. An end portion of the water-absorbing layer is present on one of a plane including the opening and an opposite side of the fuel cell with the plane including the opening being a reference. A fuel cell system having a fuel cell stack including the fuel cells. The fuel cell has a high water discharging ability and is capable of maintaining stable high generation efficiency and providing a high output even while being small-sized and light-weight.

14 Claims, 14 Drawing Sheets

(51) Int. Cl.
*H01M 4/86* (2006.01)
*H01M 8/04* (2006.01)

(52) U.S. Cl.
CPC ........... *H01M4/8657* (2013.01); *H01M 8/0245* (2013.01); *H01M 2008/1095* (2013.01); *Y02E 60/521* (2013.01)
USPC .......................................... 429/479; 429/480

(56) References Cited

U.S. PATENT DOCUMENTS

| | | | |
|---|---|---|---|
| 7,695,848 | B2 | 4/2010 | Yoshizawa et al. |
| 2002/0114989 | A1 | 8/2002 | Allen |
| 2004/0209153 | A1* | 10/2004 | Peled et al. ..................... 429/42 |
| 2005/0158593 | A1* | 7/2005 | Minehisa et al. ............... 429/12 |
| 2005/0255373 | A1 | 11/2005 | Kimura et al. |
| 2006/0014072 | A1* | 1/2006 | Hitomi ............................ 429/40 |
| 2006/0269825 | A1* | 11/2006 | Kim et al. ....................... 429/41 |
| 2011/0003216 | A1 | 1/2011 | Yoshizawa |

FOREIGN PATENT DOCUMENTS

| | | |
|---|---|---|
| JP | 6-267562 A | 9/1994 |
| JP | 10-189012 A | 7/1998 |
| JP | 11-135132 A | 5/1999 |
| JP | 2002-110182 A | 4/2002 |
| JP | 2002-313359 A | 10/2002 |
| JP | 2004-39416 A | 2/2004 |
| JP | 2005-149846 A | 6/2005 |
| JP | 2005-174607 A | 6/2005 |
| JP | 2005-353605 A | 12/2005 |

OTHER PUBLICATIONS

Non-final Office Action in U.S. Appl. No. 12/665,833 (Nov. 22, 2011).
Non-final Office Action in U.S. Appl. No. 12/665,833 (Apr. 26, 2012).
Final Office Action in U.S. Appl. No. 12/665,833 (Oct. 12, 2012).
Office Action in Canadian Application No. 2,640,726 (Jul. 3, 2012).

* cited by examiner

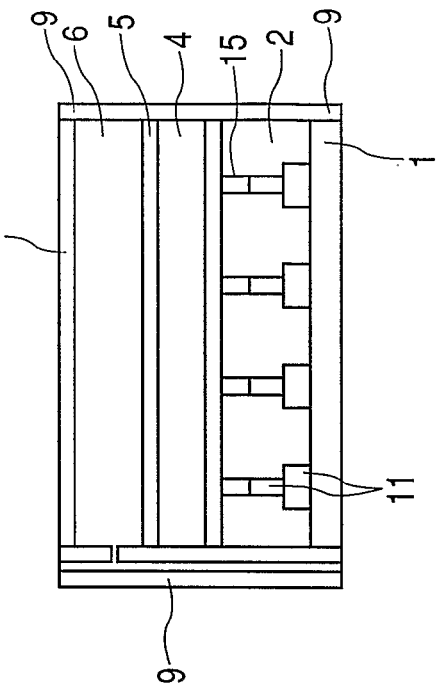
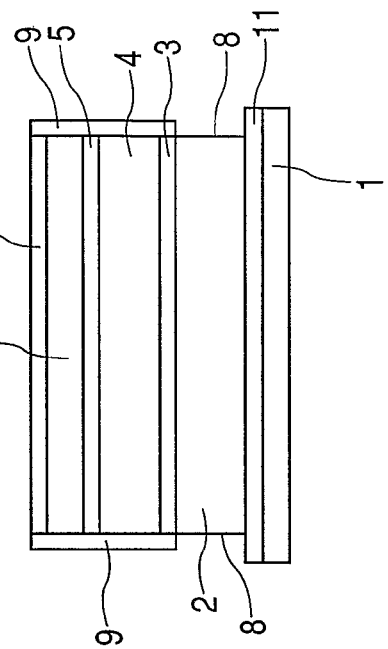
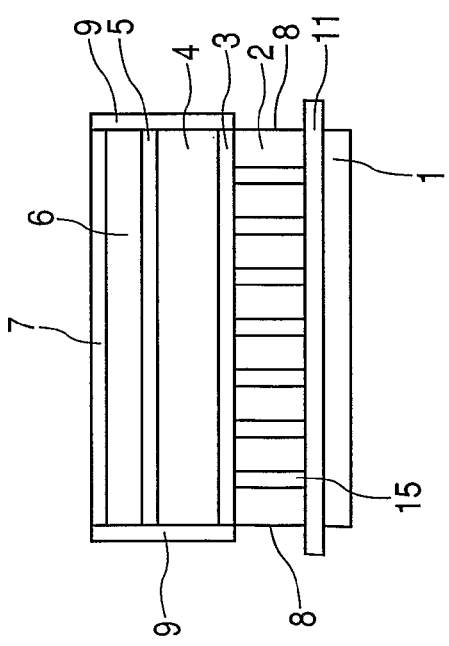
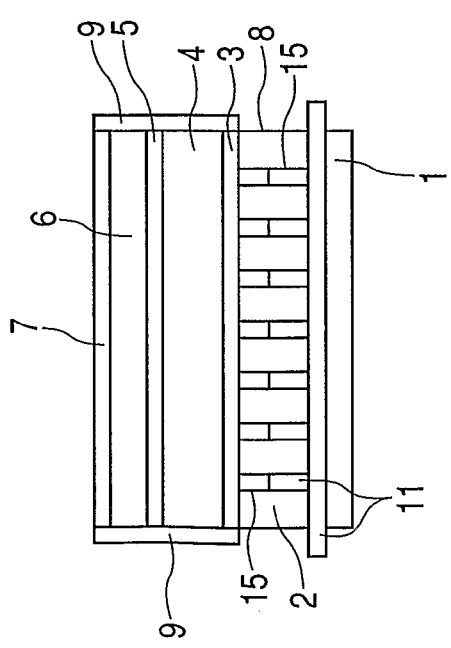

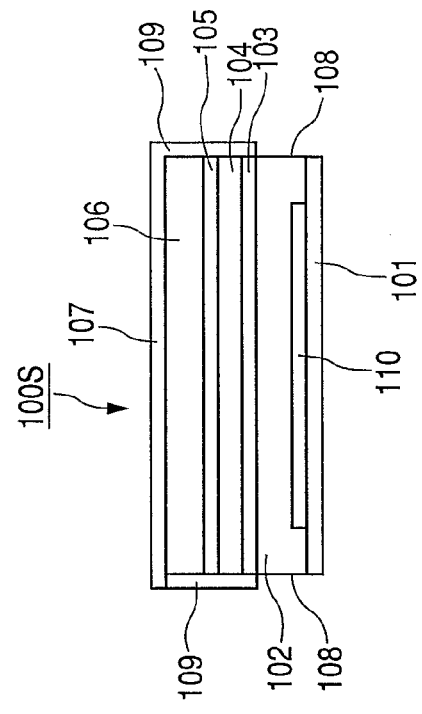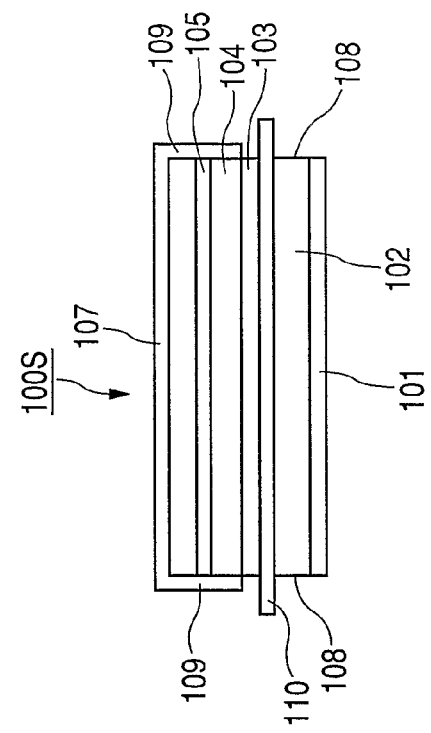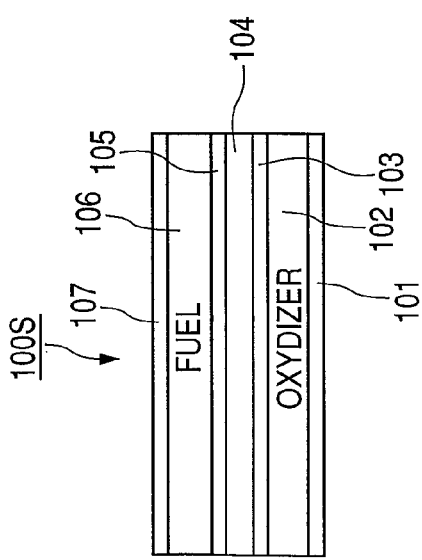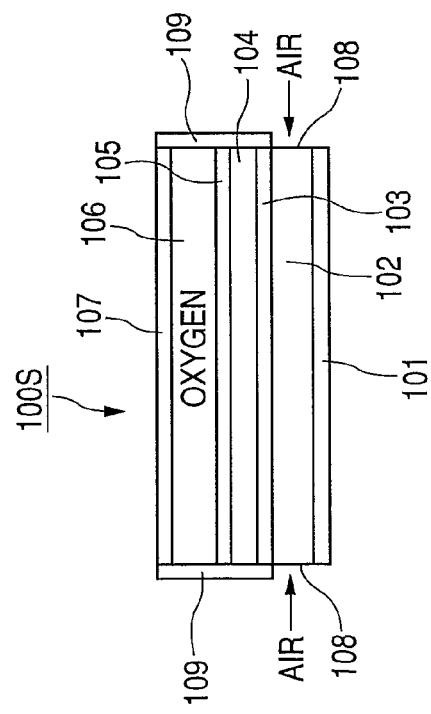

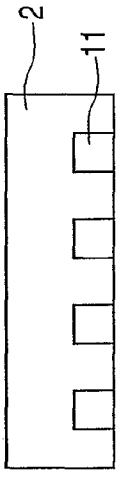
FIG. 25A
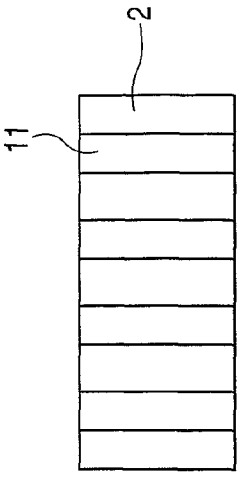
FIG. 25B
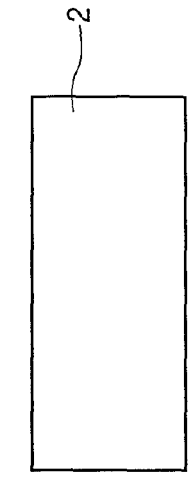
FIG. 25C
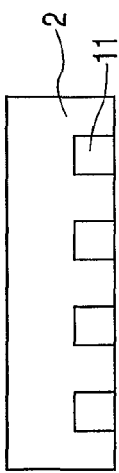
FIG. 24A
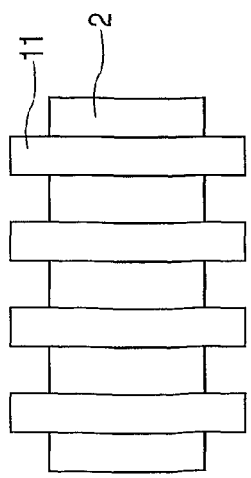
FIG. 24B
FIG. 24C

CELL WIDTH

CELL WIDTH

CELL WIDTH

CELL WIDTH

FUEL CELL

TECHNICAL FIELD

The present invention relates to a fuel cell including an oxygen supply layer that functions as a supply path for oxygen with respect to a power generation layer member and a discharge path for water molecules generated by the power generation layer member. More specifically, the present invention relates to a fuel cell capable of efficiently removing unnecessary liquid water from the power generation layer member, and a fuel cell system using the fuel cells.

BACKGROUND ART

A fuel cell system has been put into practical use. This system includes a sealed fuel gas supply space on one surface side of a power generation layer member and an oxygen supply layer on the other surface side of the power generation layer member. The power generation layer member takes in hydrogen ions from the fuel gas supply space and allows the hydrogen ions to react with oxygen on a surface on the oxygen supply layer side, thereby generating power. The oxygen supply layer is not only a supply path for providing a required amount of oxygen to the surface of the power generation layer member, but is also a diffusion (or forceful discharge) path for transporting out water molecules generated in the power generation layer member.

U.S. Pat. No. 6,423,437 shows a fuel cell system in which fuel cells, each having a power generation layer member, are stacked and connected in series. Oxygen in the atmosphere is taken in through an opening on a side surface of each fuel cell. Water in the oxygen supply layer is evaporated and diffuses to the atmosphere through the same opening. As the power generation layer member, a membrane electrode assembly, in which a porous conductive catalyst layer is formed on both surfaces of a polymer electrolyte film, is adopted. A side surface bordering the opening in a plate-shaped oxygen supply layer having three-dimensional air permeability is opened to the atmosphere. Oxygen taken in from the side surface of the oxygen supply layer diffuses three-dimensionally in the oxygen supply layer and is supplied to the entire surface of the membrane electrode assembly through one bottom surface of the oxygen supply layer. Water molecules generated in the membrane electrode assembly are taken in the oxygen supply layer as water vapor, moved to the side surface in accordance with the concentration gradient of the water vapor, and diffused into the atmosphere through the opening.

Japanese Patent Application Laid-Open No. 2005-174607 shows a fuel cell system, which forcefully sends the atmosphere from one side surface to the other side surface of an oxygen supply layer to allow it to flow. Herein, a separator with a groove-shaped air flow path passing through the opposed side surfaces of the fuel cell system is stacked on the oxygen supply layer. Then, the tissue density of the oxygen supply layer in contact with the air flow path is changed in the thickness direction. The tissue density of a surface layer in contact with the air flow path and a surface layer being in contact with the membrane electrode assembly is set to be higher than that of an intermediate layer, whereby the water-retaining property of the intermediate layer is enhanced.

Japanese Patent Application Laid-Open No. 2002-110182 shows a fuel cell system in which a catalyst layer is formed on a surface on a polymer electrolyte film side of an oxygen diffusion layer stacked on a power generation layer member. The supply of oxygen and the discharge of water vapor in the oxygen diffusion layer are performed passively by natural diffusion. The oxygen diffusion layer is allowed to pass through in the thickness direction to form an infinite number of through-holes with an aperture of 100 μm or less at a density of 400 holes per $mm^2$, whereby the diffusion performance in the thickness direction is enhanced. Each through-hole (in a cone shape), the cross-sectional area of which increases from a polymer electrolyte film side to a surface on the opposite side, increases the contact area on the polymer electrolyte film side and increases the strength of the oxygen diffusion layer, while decreasing the passage resistance of oxygen and water vapor.

Japanese Patent Application Laid-Open No. 2005-353605 discloses a fuel cell system including a water-absorbing material at an oxygen electrode, which sucks out water using capillary action, thereby suppressing flooding.

It is desirable that an integrated fuel cell system used integrally with electronic equipment supply oxygen and discharge water vapor through the oxygen supply layer passively by natural diffusion. It is desirable for such a fuel cell system not to require a supply of power from the outside for activation, because a circulation mechanism and an atmospheric blower increase the number of parts, which is contrary to the desired miniaturization and reduction in weight of the fuel cell system. A fuel cell system shown by Japanese Patent Application Laid-Open No. 2005-174607 is predicated upon such a circulation mechanism and atmospheric blower.

However, in the case where the supply of oxygen and the discharge of water vapor in the oxygen supply layer are performed fully by natural diffusion, oxygen and water vapor move in opposite directions. Therefore, if the output current of the fuel cell system increases to increase the discharge amount of water vapor, there is a possibility that the supply of oxygen may be prevented. Particularly, in the case where fuel cells are stacked and water vapor is discharged through an opening on a side surface of each fuel cell, oxygen is hindered by the flow of water vapor directed to the opening, with the result that the oxygen is unlikely to reach a portion away from the opening.

When the supply of oxygen to the power generation layer member is hindered, the electromotive power decreases to reduce the power generation efficiency of the fuel cell. When the heat generation amount increases to cause a further increase in temperature as a result of the reduction in the power generation efficiency, the water vapor partial pressure in the oxygen supply layer increases and the oxygen partial pressure decreases, with the result that the supply of oxygen with respect to the power generation layer member is further hindered.

Also, when the water vapor partial pressure of the oxygen supply layer increases, the evaporation of water generated at the interface of the power generation layer member is hindered. Liquid water accumulates and locally floods the interface. In the flooded portion, the supply of oxygen ceases and power generation stops. Therefore, the current density in a portion that is not flooded increases, and the electromotive force of the fuel cell decreases. Then, when the operation is continued as it is, flooding spreads to a region where the current density has increased, leading to the flooding of the entire surface of the power generation layer member, which may result in the overall suspension of the power generation of the fuel cell.

Thus, compared with the active type system in which the atmosphere is forcefully circulated to the oxygen supply layer to forcefully discharge water vapor, in the passive type system, depending upon natural diffusion, it is necessary to set a current per unit surface area of the power generation layer member to be extremely small. When the current per unit surface area is extremely small, the area of the power generation layer member increases to enlarge a power generation portion, which may make this fuel cell system even larger than that the active type system.

A fuel cell system shown by Japanese Patent Application Laid-Open No. 2005-174607 sets the density of a surface layer of an oxygen supply layer in contact with a power generation layer member higher than that of an intermediate layer, thereby sucking up liquid water at an interface of the power generation layer member to the intermediate layer efficiently to vaporize and diffuse the liquid water. However, the water vapor supplied to the intermediate layer accumulates in the intermediate layer to hinder the diffusion of oxygen and the supply of oxygen to the power generation layer member through the intermediate layer until the water vapor is discharged through a surface layer on an opposite side where the density has increased. Then, the surface layer for actively accumulating water in the intermediate layer member increases the water vapor pressure in the intermediate layer, thereby making it difficult for oxygen to reach the power generation layer member.

A fuel cell system shown by Japanese Patent Application Laid-Open No. 2002-110182 is predicated upon the passive type system depending upon natural diffusion, thereby enhancing the water discharge performance from a power generation layer member to an oxygen supply layer. However, the water taken in the oxygen supply layer still moves in a direction opposite to that of oxygen in the oxygen supply layer due to natural diffusion of water vapor. That is, the water vapor partial pressure of the oxygen supply layer is not decreased so as to facilitate the evaporation of water generated in the power generation layer member, and the movement/diffusion of oxygen through the oxygen supply layer is not facilitated.

A fuel cell system shown by Japanese Patent Application Laid-Open No. 2005-353605 has a configuration in which a catalyst is surrounded by a water-absorbing material. This reduces the size of the catalyst portion, which makes it difficult for the fuel cell to exhibit sufficient performance.

DISCLOSURE OF THE INVENTION

The present invention provides a fuel cell capable of discharging generated water generated in accordance with the power generation from an oxygen supply layer easily without depending upon a forceful and active procedure, maintaining stable high power generation efficiency even at a high current, and achieving a high output even with a small size and a light weight. The present invention also provides a fuel cell system including such fuel cells.

According to the present invention, there is provided a fuel cell including: a power generation layer member for moving hydrogen ions from one surface to another surface and causing the hydrogen ions to react with oxygen on the other surface; and an oxygen supply layer for diffusing oxygen in an atmosphere taken in from a side surface to supply the oxygen to the other surface. This fuel cell has a water-absorbing layer, which has a higher stability for holding liquid water than the oxygen supply layer and which communicates with the oxygen supply layer. The water-absorbing layer is placed opposite to the power generation layer member with at least the oxygen supply layer interposed therebetween.

It is preferable that the water-absorbing layer be a sheet-shaped member made of a material different from that of the oxygen supply layer and that the material for the water-absorbing layer be more hydrophilic than the material for the oxygen supply layer.

It is preferable that air permeability of the oxygen supply layer in a direction communicating the power generation layer member with the water-absorbing layer be higher than that in a direction along a surface of the power generation layer member.

It is preferable that the fuel cell include a diffusion layer placed between the oxygen supply layer and the power generation layer member. It is also preferable that the average opening size of a tissue of this diffusion layer be smaller than that of the oxygen supply layer and larger than that of the power generation layer member. It is also preferable that the diffusion layer have a number of through-holes through which the oxygen supply layer can communicate with the power generation member.

It is preferable that at least a part of the water-absorbing layer be directly opened to an atmosphere outside of the oxygen supply layer.

It is preferable that the water-absorbing layer at a plane position close to the side surface from which oxygen is taken in have a higher stability for holding liquid water than at a plane position away from that side surface.

It is preferable that the supply of oxygen from the side surface from which oxygen is taken in to the power generation layer member depend upon natural diffusion of oxygen through the oxygen supply layer.

Furthermore, according to the present invention, there is also provided a fuel cell including an electrolyte film, a catalyst layer, two diffusion layers, a fuel supply layer, an oxygen supply layer, a water-absorbing layer, and a collector. The fuel cell has an opening at least in a part of a side surface parallel to a proton conduction direction of the electrolyte film among side surfaces of the fuel cell, the water-absorbing layer is present between the oxygen supply layer and the collector, and an end portion of the water-absorbing layer is present on a plane including the opening or an opposite side of the fuel cell with the plane including the opening being a reference.

It is preferable that the water-absorbing layer include a plurality of regions each having hydrophilicity different from that of a different region and that the hydrophilicity be higher in a region closer to the opening among the plurality of regions.

It is preferable that the oxygen supply layer have a groove on a surface thereof in the collector side and at least a part of the water-absorbing layer be present in the groove.

It is preferable that the oxygen supply layer have a plurality of holes, each with a depth direction parallel to the proton conduction direction.

It is preferable that the water-absorbing layer be present in the hole.

It is preferable that the water-absorbing layer present between the oxygen supply layer and the collector be connected to the water-absorbing layer present in the hole.

It is preferable that the water-absorbing layer not be in contact with the diffusion layer.

It is preferable that an end portion of the collector be present on the opposite side of the fuel cell with the plane including the opening being a reference, and at least a part of a region present on an opposite side of the fuel cell with the plane including the opening in the collector being a reference be in contact with the water-absorbing layer.

It is preferable that the collector have a comb shape.

It is preferable that a fuel cell system include a fuel cell stack made of the fuel cells.

BRIEF DESCRIPTION OF THE DRAWINGS

FIG. 10 is a cross-sectional view in which a fuel cell in Embodiment 4 is cut along a plane perpendicular to a plane including openings.

FIG. 11 is a cross-sectional view in which a fuel cell in Embodiment 5 is cut along a plane perpendicular to a plane including openings.

FIG. 12 is a cross-sectional view in which the fuel cell in Embodiment 5 is cut along the plane parallel to the plane including the openings.

FIG. 13 is a cross-sectional view in which a fuel cell in Embodiment 6 is cut along a plane perpendicular to a plane including openings.

FIG. 20 is a cross-sectional view in which a fuel cell in Comparative Embodiment 1 is cut along a plane parallel to a plane including openings.

FIG. 21 is a cross-sectional view in which the fuel cell in Comparative Embodiment 1 is cut along a plane perpendicular to the plane including the openings.

FIG. 22 is a cross-sectional view in which a fuel cell in Comparative Embodiment 2 is cut along a plane perpendicular to a plane including openings.

FIG. 23 is a cross-sectional view in which a fuel cell in Comparative Embodiment 3 is cut along a plane perpendicular to a plane including openings.

FIGS. 24A, 24B, and 24C are views illustrating water-absorbing layers and an oxygen supply layer in Example 1.

FIGS. 25A, 25B, and 25C are views illustrating water-absorbing layers and an oxygen supply layer in Example 2.

BEST MODE FOR CARRYING OUT THE INVENTION

Figure 1:
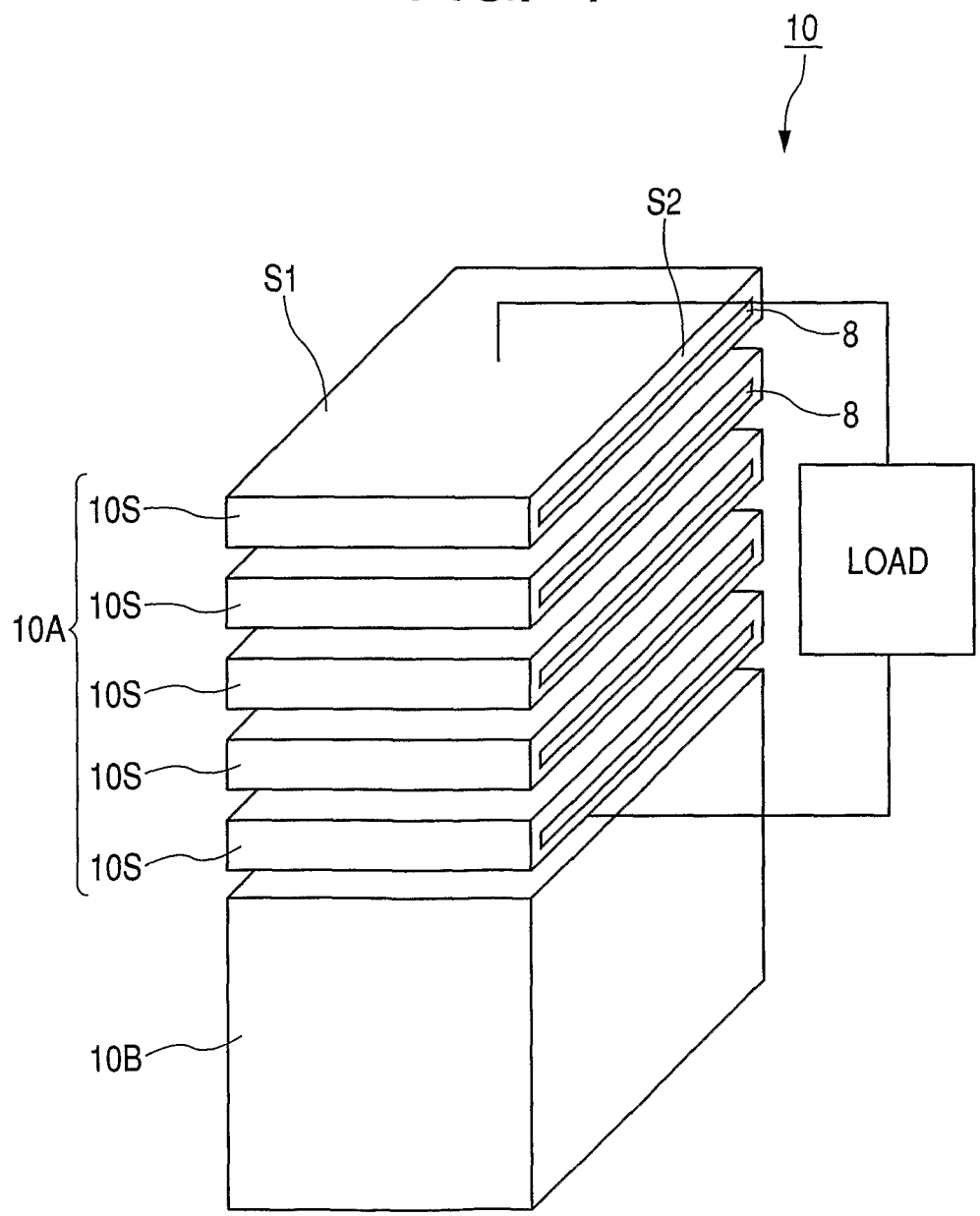
FIG. 1 is a perspective view illustrating an entire configuration of a fuel cell system in Embodiment 1.

Hereinafter, embodiments of a fuel cell and a fuel cell system of the present invention will be described in detail with reference to the drawings.

The fuel cell and fuel cell system of the present invention are not limited to the configuration described below. A fuel cell at least including a membrane electrode assembly (power generation layer member), two diffusion layers, an oxygen supply layer, a water-absorbing layer, and a fuel supply layer can be provided even in another embodiment in which a part of or the entire configuration is replaced by an alternative configuration.

In the fuel cell and the fuel cell system of this embodiment, power is generated using fuel gas stored in a fuel tank. However, liquid fuel containing hydrogen, such as methanol, may be stored in a fuel tank and reformed to a required amount of fuel gas.

The fuel cell system of this embodiment can be used for portable electronic equipment, such as a digital camera, a digital video camera, a small projector, a small printer, and a notebook personal computer. In such a case, the fuel cell system of the present invention can also be used as an independent fuel cell to be mounted detachably, and only a power generation portion of the fuel cell system is incorporated integrally with electronic equipment so that a fuel tank is attached/detached.

The respective embodiments of the present invention are as follows.

Embodiment 1 provides a fuel cell with a configuration in which a water-absorbing layer is provided between an oxygen supply layer and a collector and in which an end portion of the water-absorbing layer is present on a plane including openings. It also provides a fuel cell system including such fuel cells.

Embodiment 2 provides a fuel cell with a configuration in which a water-absorbing layer is provided between an oxygen supply layer and a collector and in which an end portion of the water-absorbing layer is present on an opposite side of the fuel cell with a plane identical with openings being a reference. It also provides a fuel cell system including the such cells.

Embodiment 3 provides a fuel cell with a configuration in which the water-absorbing layer in Embodiment 2 includes a plurality of regions with different hydrophilicity, and the hydrophilicity is higher in a region closer to an opening among the plurality of regions. It also provides a fuel cell system including such fuel cells.

Embodiment 4 provides a fuel cell with a configuration in which the oxygen supply layer in Embodiment 2 has a through-hole and a fuel cell system including such fuel cells.

Embodiment 5 provides a fuel cell with a configuration in which the oxygen supply layer in Embodiment 2 has a groove and a hole and in which a water-absorbing layer is present in the groove and the hole. It also provides a fuel cell system including such fuel cells.

Embodiment 6 provides a fuel cell with a configuration in which a collector in contact with an oxygen supply layer also has an end portion on an opposite side from the fuel cell, with a plane including openings being a reference in Embodiment 2, and a fuel cell system including such fuel cells.

Embodiment 7 provides a fuel cell with a configuration in which a portion present on an opposite side from the fuel cell has a comb shape with a plane including openings in the collector being a reference in Embodiment 6. It also provides a fuel cell system including such fuel cells.

Embodiment 1

Figure 2:
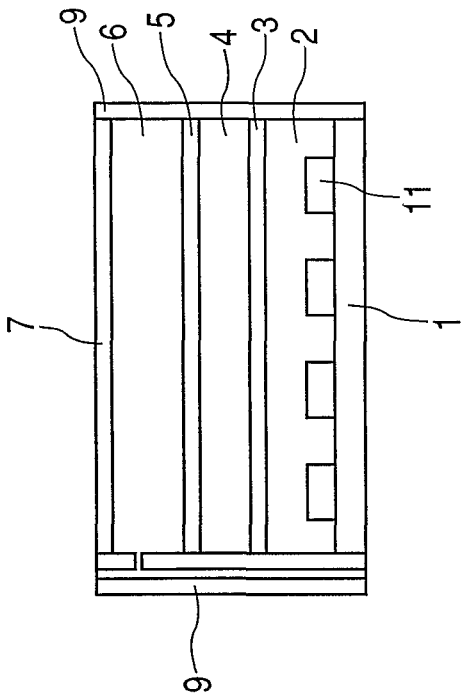
FIG. 2 is a cross-sectional view in which the fuel cell in Embodiment 1 is cut along a plane parallel to a plane including the openings.
Figure 6:
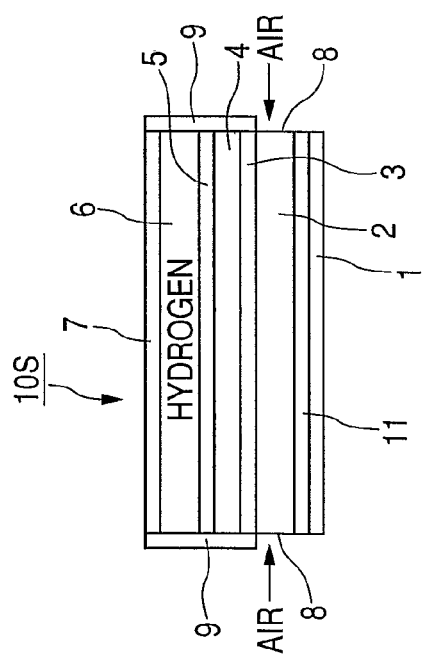
FIG. 6 is a cross-sectional view in which the fuel cell in Embodiment 1 is cut along a plane perpendicular to the plane including the openings.

FIG. 1 is a perspective view illustrating an entire configuration of a fuel cell system in Embodiment 1. FIG. 2 is a cross-sectional view in which a fuel cell constituting the fuel cell system is cut along a plane parallel to a plane including openings. Further, FIG. 6 is a cross-sectional view in which the fuel cell is cut along a plane perpendicular to the plane including the openings. In FIG. 6, right and left ends 8 on the drawing surface of the fuel cell are openings.

As illustrated in FIG. 1, a fuel cell system 10 includes a cell stack (fuel stack) 11A in which fuel cells (power generation cells) 10S are stacked to be connected in series. A fuel tank 10B for storing fuel gas and supplying it to the fuel cells 10S is present below the cell stack 10A. The cell stack 10A and the fuel tank 10B are connected to each other through a flow path (not shown) of the fuel gas. The fuel gas taken out from the fuel tank 10B is adjusted to a pressure slightly higher than the atmospheric pressure and supplied to each fuel cell 10S.

The fuel cell 10S has openings 8 in end surfaces S1 and S2 of the cell in a direction parallel to a proton conduction direction of an electrolyte film, among side surfaces of the fuel cell. More specifically, the fuel cell 10S has the openings 8 on two side surfaces among the side surfaces parallel to the proton conduction direction among the side surfaces of the oxygen supply layer. The opening 8 functions as an air intake port for drawing atmospheric air into the fuel cell 10S by natural diffusion. The fuel cell 10S generates power by allowing the fuel gas supplied from the fuel tank 10B to react with oxygen from the air taken in through the openings 8. As in this embodiment, due to the presence of the openings on the side surfaces parallel to the proton conduction direction among the side surfaces of the fuel cell, even in the case of forming a fuel cell system in which a plurality of fuel cells are stacked to be connected, it is not possible for the openings of one fuel cell to be closed by another fuel cell to hinder the air intake. In the case where the fuel cell is a rectangular solid, as illustrated in FIG. 2, it is preferable that the openings be provided on two opposed side surfaces. Further, in the case where a side surface has a cylindrical shape, it is preferable that an opening becomes a part of a side surface of a cylinder and openings are provided respectively on opposed side surfaces of the cylinder.

As illustrated in FIG. 2, the fuel cell 10S includes at least a membrane electrode assembly (MEA) 4, diffusion layers 3 and 5, a fuel supply layer 6, an oxygen supply layer 2, a water-absorbing layer 11, a collector 1, and separators 7 and 9.

As illustrated in FIG. 6, the oxygen supply layer 2 plays two roles: supplying and diffusing oxygen in the atmosphere, which is an oxidizer taken in through the openings 8 to the oxygen supply layer, and flowing electrons required for an electrode reaction in a catalyst layer (oxygen electrode) to a catalyst layer (oxygen electrode) of the membrane electrode assembly 4 through the diffusion layer 3. Further, the oxygen supply layer 2 also guides water (water vapor) generated in the membrane electrode assembly 4 in accordance with the power generation from the diffusion layer 3 to the openings 8 to discharge the water from the inside of the cell to the atmosphere. Therefore, it is preferable to use a conductive porous body as the oxygen supply layer 2. It is preferable that the porosity of such oxygen supply layer 2 be 80% or more and the hole diameter be 0.1 mm or more. Among the specific examples of materials for the oxygen supply layer 2, foam metal, stainless wool, and the like are preferable.

In this example, the collector 1 functions as both a partition (separator) with respect to an adjacent fuel cell 10S and a collector that collects electricity. Thus, the collector 1 may be described as a separator. Further, in the case where the collector 1 does not function as a separator and a different separator is present, this separator is formed at a position opposite to the oxygen supply layer 2 with the collector 1 interposed therebetween.

The separators 7 and 9 are sealed so that a passage portion for fuel gas, which is the fuel of the fuel cell 10S, is not mixed with outside air. Further, the fuel supply layer 6 and the diffusion layer 5 are present between the separator 7 and the membrane electrode assembly 4. In this example, the separator 7 also functions as the collector.

The fuel gas taken out from the fuel tank 10B illustrated in FIG. 1 is supplied to the fuel supply layer 6 illustrated in FIG. 2 and, after that, diffuses in the diffusion layer 5. As the fuel supply layer 6, carbon cloth and carbon paper having a carbon particle layer on its surface can be used.

It is preferable that the average opening diameter of a material for constituting the fuel supply layer 6 be in a range of 100 μm to 900 μm. The fuel gas is separated from a main flow path of the fuel gas present in parallel to the proton conduction direction in the separator 9 and supplied to the fuel supply layer in the fuel cell 10S.

The diffusion layer 5 is present between the membrane electrode assembly 4 and the fuel supply layer 6 so as to be in contact with both of them, diffuses hydrogen gas that is used as the fuel, and collects residual electrons from the ionization of hydrogen from the catalyst layer of the membrane electrode assembly 4. Further, the diffusion layer 3 is present between the membrane electrode assembly 4 and the oxygen supply layer 2 so as to be in contact with both of them and plays the role of diffusing oxygen and supplying electrons required for an electrode reaction in the catalyst layer (oxygen electrode) to the catalyst layer (oxygen electrode) of the membrane electrode assembly 4. The diffusion layer 5 is conductive and is made of a material having a hole smaller than that of the material of the fuel supply layer 6. In the present invention, the tissue of the diffusion layer refers to a material constituting the diffusion layer. Further, "the diffusion layer 5 is made of a material having a hole smaller than that of the material of the fuel supply layer 6" means that the average hole diameter of a material constituting the diffusion layer 5 is smaller than the average hole diameter of a material constituting the fuel supply layer 6. Further, the average opening diameter (hole diameter) of a material constituting the diffusion layer 5 has an opening diameter (1 μm), which is an intermediate value between the average opening diameter of a material constituting the catalyst layer that is a fuel electrode and the average opening diameter of a material constituting the fuel supply layer. Thus, the fuel supply layer 6 functions as a diaphragm resistor and supplies fuel gas at an equal pressure and an equal flow rate density over the entire surface of the membrane electrode assembly 4.

Further, the diffusion layer 3 is also conductive and is made of a material having a hole smaller than that of the material of the oxygen supply layer 2. The average opening diameter of a material constituting the diffusion layer 3 is similarly larger than the average opening diameter of a material constituting the catalyst layer that is an oxygen electrode and smaller than the average opening diameter of a material constituting the oxygen supply layer 2. With such an opening diameter, the oxygen supply layer 2 functions as a diaphragm resistor and supplies oxygen at an equal pressure and an equal flow rate density over the entire surface of the membrane electrode assembly 4. The hole of the diffusion layer 3 may be a through-hole communicating the oxygen supply layer 2 with the membrane electrode assembly 4. Since the diffusion layer 3 has though-holes at a high density, generated water accumulated between the membrane electrode assembly 4 and the diffusion layer 3 can also be sucked up to the oxygen supply layer 2. Carbon paper and carbon cloth can be used as materials for the diffusion layer 3 and the diffusion layer 5.

Figure 3:
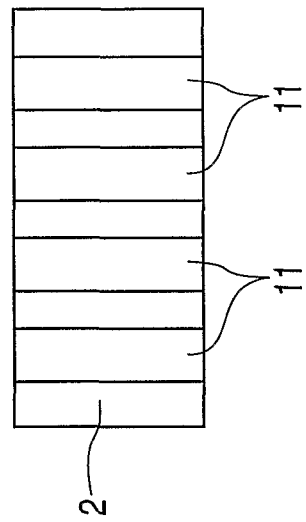
FIG. 3 is a cross-sectional view in which a membrane electrode assembly in Embodiment 1 is cut along the plane parallel to the plane including the openings.

As illustrated in FIG. 3, the membrane electrode assembly 4 includes an electrolyte film 12 and two catalyst layers 13 and 14 (a fuel electrode and an oxygen electrode, respectively) formed so as to be in contact with both surfaces of the electrolyte film. The electrolyte film may be made of any material, as long as proton conduction can be performed in a direction from the fuel supply layer to the oxygen supply layer. Among such electrolyte films, a solid polymer electrolyte film is preferable and examples thereof include Nafion (Trade Mark) produced by Dupont, which is a perfluorocarbon polymer with a sulfonic group.

Two catalyst layers constituting the membrane electrode assembly 4 contain at least a catalytically active substance. In the case where a substance having a catalytic activity cannot be present as a single substance, a catalyst layer may be formed by allowing a carrier to carry a catalytically active substance. As an example of the catalytically active substance present as a single substance, there is a platinum catalyst, such as platinum black or platinum catalysts having a dendritic structure formed by sputtering. A carbon particle carrying platinum is an example of a carrier carrying a catalytically active substance. The catalyst layer may contain an electron conductor and a proton conductor (polymer electrolyte material), such as carbon particles. The catalyst layer may be integrated so as to be in contact with the surface of the electrolyte film, but as long as the catalyst layer is in contact with the electrolyte film and chemical species, such as hydrogen ions, can be delivered, it is not necessary to form the catalyst layer integrally with the membrane electrode assembly 4. Further, the average opening diameter of the catalyst layer is preferably in a range of 10 nm to 100 nm. In the following description, the catalyst layer on the fuel supply layer side may be called a fuel electrode and the catalyst layer on the oxygen supply layer side may be called an oxygen electrode.

The fuel cell of the present invention is of a passive type, which performs the supply of oxygen and the discharge of water vapor through an opening by natural diffusion of oxygen. As is understood from the figures, the region of the oxygen supply layer 2 other than the openings 8 is surrounded by the collector 1. Thus, water generated at the oxygen electrode becomes a vapor through the diffusion layer 3 and, after that, is cooled by the collector 1 to become water droplets in the oxygen supply layer 2. When the amount of water droplets becomes excessive, the water droplets may close the oxygen supply layer 2. Therefore, the decrease in oxygen diffusion causes a voltage drop, which is caused by flooding.

In order to solve the above-mentioned problem, the water-absorbing layer 11 is formed in a region between the collector 1 and the oxygen supply layer 2, where water droplets are generated. The water-absorbing layer 11 is formed so that it communicates with the oxygen supply layer 2 and an end portion of the water-absorbing layer 11 is present on a plane including the openings 8. That is, the water-absorbing layer 11 is formed at a position opposite to the membrane electrode assembly 4 at a distance from the diffusion layer 3 and the oxygen supply layer 2 and at a position where the end portion of the water-absorbing layer 11 is likely to come into contact with outside air through the openings 8. The water-absorbing layer 11 is placed only in a part between the collector 1 and the oxygen supply layer 2. Thus, the electrical contact between the collector 1 and the oxygen supply layer 2 is not hindered. For example, such an arrangement may be made by providing a groove in at least one of the oxygen supply layer 2 and the collector 1 and arranging the water-absorbing layer 11 in the groove.

Figure 4:
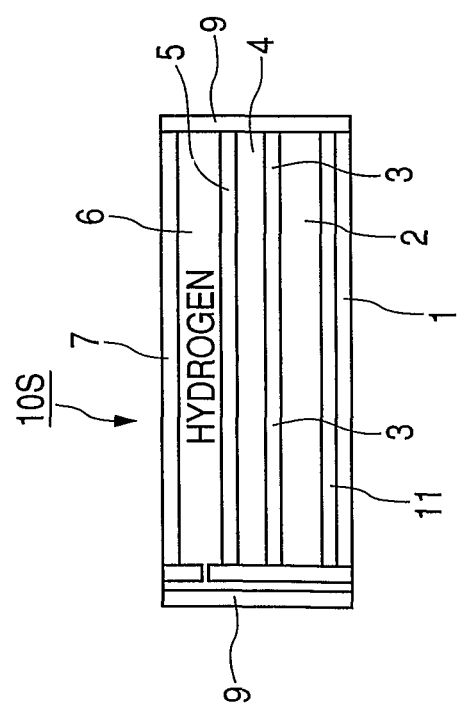
FIG. 4 is a cross-sectional view in which a fuel cell including a plurality of water-absorbing layers is cut along the plane parallel to the plane including the openings in Embodiment 1.
Figure 5:
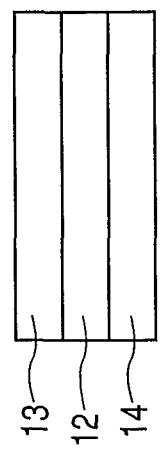
FIG. 5 is a projected view in which light is irradiated in a direction parallel to a proton conduction direction from a collector side to a plurality of water-absorbing layers and an oxygen supply layer in Embodiment 1.

Further, only one water-absorbing layer 11 may be formed as illustrated in FIG. 2, or a plurality of water-absorbing layers 11 may be formed as illustrated in FIG. 4. FIG. 5 is a projected view in which light is irradiated in a direction parallel to a proton conduction direction from the collector 1 side to the water-absorbing layer 11 and the oxygen supply layer 2 in the fuel cell of FIG. 4.

In the case where the water-absorbing layer 11 is formed in the groove of the oxygen supply layer 2, it is preferable that the thickness of the water-absorbing layer 11 be smaller than that of the oxygen supply layer 2 so that the water-absorbing layer 11 does not hinder the oxygen diffusion in the oxygen supply layer 2. For example, in the case where the thickness of the oxygen supply layer 2 is 1 mm or more and 3 mm or less, the thickness of the water-absorbing layer 11 is preferably 1 μm or more and less than 1 mm.

Further, the water-absorbing layer 11 includes a water-absorbing material. The water-absorbing material constituting the water-absorbing layer 11 is preferably a sheet-shaped material, which is made of fibers having a quick-drying property as well as an ability to absorb water. Preferably, it is a sheet-shaped material, which is more hydrophilic than the material for the oxygen supply layer 2 and is independent from the oxygen supply layer 2. When a material constituting the water-absorbing layer 11 is more hydrophilic than a material for the oxygen supply layer 2, water is more likely to move from the oxygen supply layer 2 to the water-absorbing layer 11. In the present invention, "stability for holding liquid water" has the same meaning as "hydrophilicity". When the surface is made of a hydrophilic material, hydrophilicity is higher than when a water-repellent (hydrophobic) material is used. Thus, the stability for holding liquid water can be considered to be high. Further, in the case of using a hydrophilic material, it can be considered that hydrophilicity is higher (stability for holding liquid is higher) when the average opening diameter (gap) of the surface of the hydrophilic material is smaller. If the surface is made of a water-repellent (hydrophobic) material, it can be considered that hydrophilicity is higher (stability for holding liquid is higher) when the average opening diameter (gap) of a tissue is larger.

Further, in the present invention, a "water-absorbing material" refers to a material capable of sucking up water by capillary action and, more specifically, a water-absorbing material with a water suction height of 30 mm or more 10 seconds after the material is soaked in water. Further, the "quick-drying material" refers to a material capable of easily drying and releasing absorbed water and, more specifically, a material with a drying ratio of 80% or more after one hour in an atmosphere of 50% humidity and 25° C. Herein, the drying ratio refers to a ratio of the weight of water remaining in the water-absorbing layer after being left for one hour in a constant temperature and constant humidity tank in a windless state and the weight of water absorbed by the water-absorbing layer by capillary action. For example, in the case where the weight of water-absorbing fibers is 0.5 g, and the total weight of the water-absorbing fibers after absorbing water by capillary action becomes 1.5 g, the weight of absorbed water is 1 g. Assuming that the total weight of the fibers is 0.6 g after being left for one hour in a constant temperature and constant humidity tank (50% humidity and 25° C.) in a windless state, the weight of water remaining in the water-absorbing fibers is 0.1 g, i.e., the weight of dried water is 0.9 g. Thus, the drying ratio at this time is 90%.

Examples of such a material having a water-absorbing property and a quick-drying property include a porous material with high hydrophilicity on the surface. A "material with high hydrophilicity" in accordance with the present invention is a material that has a contact angle with a water droplet formed on the material of 90° or less.

The water-absorbing layer 11 plays roughly two roles.

The first role of the water-absorbing layer 11 is to absorb water, which coagulates (is generated) in the oxygen supply layer 2, and to allow the oxygen supply layer 2 to keep an oxygen diffusion flow path. The water generated in the membrane electrode assembly 4 by the power generation activity is discharged to the oxygen supply layer 2 through the diffusion layer 3 placed on the outer side of the membrane electrode assembly 4. In the case where there is no water-absorbing layer 11, the generated water discharged to the oxygen supply layer 2 is not removed from the oxygen supply layer 2, except for being evaporated to diffuse (to be released) outside of the cell through the openings 8. The generated water discharged to the oxygen supply layer 2 cannot evaporate sufficiently only by the natural diffusion from the oxygen supply layer 2, which narrows the oxygen diffusion flow path of the oxygen supply layer 2 and enhances the water vapor partial pressure of the oxygen supply layer 2, thereby hindering the flow of the generated water and water vapor discharged to the oxygen supply layer 2 through the diffusion layer 3. That is, when the amount of water in the oxygen supply layer 2 becomes excessive, the discharge of water from the membrane electrode assembly 4 through the diffusion layer 3 is hindered, and the surface of the membrane electrode assembly 4 is partially submerged in water (flooding). Thus, the supply of oxygen to the membrane electrode assembly 4 is hindered.

However, when the water-absorbing layer 11 made of a water-absorbing material is present, water vapor and fog droplets are collected actively from the oxygen supply layer 2 by the capillary action of the water-absorbing layer 11, and generated water is formed in the water-absorbing layer 11. Thus, even in the case where a hole diameter is larger or a hole ratio is greater as the oxygen supply layer 2 has less capillary action, the generated water in the oxygen supply layer 2 is taken in the water-absorbing layer 11 by the capillary action of the water-absorbing layer 11. That is, the water-absorbing layer 11 can alleviate the inhibition of the supply of oxygen and the discharge of water vapor through the openings 8.

Further, due to the presence of the end portion of the water-absorbing layer on a plane including the openings, liquid water absorbed by the water-absorbing layer 11 is likely to come into contact with outside air and is evaporated to diffuse efficiently. In the present invention, in the case where the opening has a curved surface, the plane including the openings refers to a curved surface formed by moving the curved surface in parallel to the proton conduction direction. Further, in the case where the opening has a curved surface, the plane perpendicular to the plane including openings refers to a plane parallel to a symmetric plane of the plane including the curved surface.

The surface of the collector 1 on the water-absorbing layer 11 side may be subjected to a special surface treatment for enhancing hydrophilicity. Examples of such a treatment include a hydrophilic coating with respect to the collector 1, a sandblast treatment of the surface of the collector 1 using a material with very a high hydrophilicity, and sputter coating of titanium oxide and silicon oxide with respect to the collector 1. Thus, liquid water coagulates on the surface and permeates and diffuses along the surface.

The second role of the water-absorbing layer 11 is to maintain a constant humidity in the oxygen supply layer 2.

When the amount of water of the membrane electrode assembly 4 becomes insufficient, a dryout phenomenon in which an electrolyte film is dried and hydrogen ions are not conducted occurs. Thus, it is desirable that the humidity in the fuel cell 10S be kept at an appropriate level. Since the humidity is kept constant due to the presence of the water-absorbing layer 11, in the case where the membrane electrode assembly 4 is dried, the water evaporated from the water-absorbing layer 11 is absorbed by the electrolyte film. That is, the water-absorbing layer 11 simultaneously prevents a dryout and flooding during extreme drying or when the fuel cell 10S is not used and keeps the fuel cell 10S at an appropriately humidity.

Embodiment 2

Figure 7:
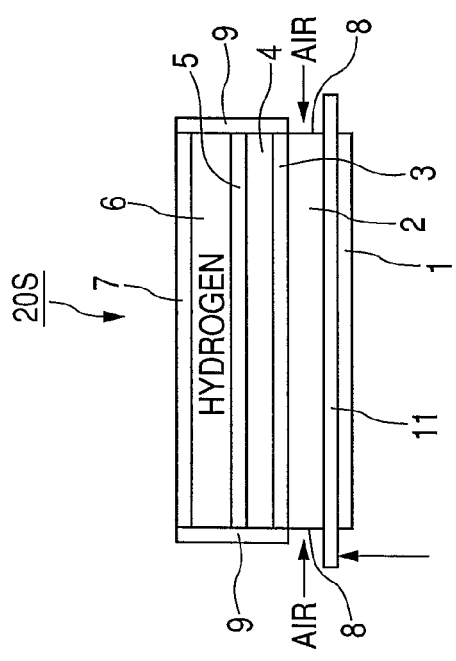
FIG. 7 is a cross-sectional view in which a fuel cell in Embodiment 2 is cut along the plane perpendicular to the plane including the openings.

FIG. 7 is a cross-sectional view in which a fuel cell in Embodiment 2 is cut along a plane perpendicular to a plane including openings. In Embodiment 2, a fuel cell system can be assembled in the same way as those in Embodiment 1, except that the shape of the water-absorbing layer 11 is different from that of Embodiment 1. Thus, this embodiment is also described with reference to FIG. 1. The common constitutions in FIGS. 2 and 6 are denoted with the common reference numerals. A detailed description of the same constituents is omitted.

Figure 8:
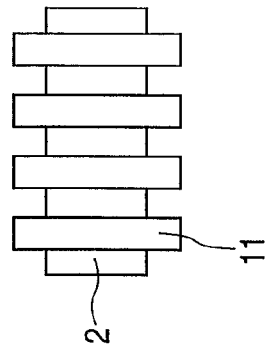
FIG. 8 is a projected view in which light is irradiated in a direction parallel to a proton conduction direction from a collector side to a plurality of water-absorbing layers and an oxygen supply layer in Embodiment 2.

As illustrated in FIG. 7, a fuel cell 20S in Embodiment 2 is a fuel cell having a configuration in which, in the fuel cell 10S in Embodiment 1, a water-absorbing layer is formed so that an end portion is placed on an opposite side of the fuel cell 10S with a plane including openings being a reference. Further, FIG. 8 illustrates the water-absorbing layers 11 and the oxygen supply layer 2 in the case where a plurality of water-absorbing layers are formed in this embodiment, which is a projected view in which light is irradiated to the fuel cell of FIG. 7 in the case of a plurality of water-absorbing layers in a direction parallel to the proton conduction direction from the collector 1 side.

More specifically, unlike in Embodiment 1, the water-absorbing layer 11 in this embodiment is extended (expanded) from the openings 8, which are oxide supply ports, to be exposed to the outside of the fuel cell 20S. Thus, at least a part of the water-absorbing layer 11 comes into direct contact with the air outside (atmosphere) of the cell.

By adopting the configuration in which the water-absorbing layer 11 is exposed to the outside of the fuel cell 20S as in this embodiment, the contact area with respect to outside air increases, whereby water in the water-absorbing layer can be transpired more efficiently than in Embodiment 1. Particularly, in an environment with a large amount of generated water, such as a high humidity environment, water in the water-absorbing layer can be transpired more efficiently in accordance with this embodiment. The phrase "at least a part of the water-absorbing layer is directly opened to the atmosphere outside of the oxygen supply layer" means that, in a cross-section obtained by cutting a fuel cell along a cross-section perpendicular to the openings, the end portion of the water-absorbing layer is present on the opposite side of the fuel cell with a plane including the openings being a reference, and the water-absorbing layer is exposed directly to the atmosphere.

It is further desirable that a portion (portion extending out from the fuel cell 20S) present on the opposite side of the fuel cell 20S with a plane including the openings in the water-absorbing layer 11 being a reference be not only extended, but also be shaped so that the surface area is further increased by artificially forming an unevenness, because the contact area with respect to outside air increases.

Embodiment 3

Figure 9:
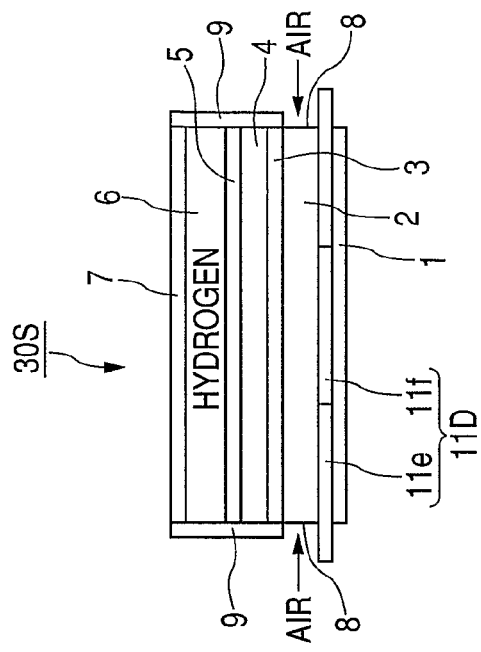
FIG. 9 is a cross-sectional view in which a fuel cell in Embodiment 3 is cut along a plane perpendicular to a plane including openings.

FIG. 9 is a view illustrating a configuration of a fuel cell in Embodiment 3. FIG. 9 is a cross-sectional view in which the fuel cell in this embodiment is cut along a plane perpendicular to a plane including openings. In Embodiment 3, components similar to those in Embodiment 2 are used, except that the internal configuration of the water-absorbing layer 11 is different from that in Embodiment 2, and the fuel cells in this embodiment are stacked and connected similarly to those in Embodiment 1, whereby a fuel cell system in this embodiment can be assembled. Thus, the detailed description of the configurations common to those of FIG. 7 denoted with the common reference numerals is omitted.

In a fuel cell 30S in Embodiment 3, by using a water-absorbing layer 11D with the strength of hydrophilicity varied depending upon a place, instead of the water-absorbing layer 11 of FIG. 7, the discharge performance of discharging water toward the opening 8 is enhanced. Specifically, in the water-absorbing layer, a plane position closer to the side surface from which oxygen is taken in has a higher stability for holding liquid water compared with a plane position away from the side surface from which oxygen is taken in. More specifically, by allowing a place closer to the opening 8 to have stronger hydrophilicity, water can be attracted from the center portion of the oxygen supply layer 2 to the outside, i.e., in a direction of the opening 8 where evaporation and diffusion (transpiration) are likely to occur.

A description will be made specifically with reference to FIG. 9. The water-absorbing layer 11D includes a water-absorbing layer 11e on an outer side closer to the opening 8 and a water-absorbing layer 11f in a center portion. The hydrophilicity of 11e is set to be higher than that of 11f. The strength of hydrophilicity can be determined based on the contact angle of a member with respect to a water droplet formed on the surface of the member. The smaller contact angle shows that the member is more hydrophilic (higher hydrophilicity).

Thus, when the contact angle with water in the water-absorbing layer 11f is $\theta_f$ and the contact angle of water in the water-absorbing layer 11e is $\theta_e$, it is desirable that $\theta_e < \theta_f < 90°$.

With such a configuration, the liquid water in the water-absorbing layer 11 naturally permeates from a less hydrophilic region (11f) to a more hydrophilic region (11e) and moves in a plane direction (direction perpendicular to the proton conduction direction).

In the case of forming a water-absorbing layer of at least three kinds of regions, similarly, a region closer to the opening (closer to the outside of the cell) is set to be a region having a higher hydrophilicity. In order to form the water-absorbing layer 11D with at least two regions having partially different hydrophilicities so as to enhance discharge performance, it is not necessary to prepare at least two kinds of members (materials). For example, a hydrophobic treatment with respect to a part (center portion) of a water-absorbing layer member using one kind of material, or a further hydrophilic treatment in the vicinity of the opening 8, can also be performed.

Further, a change in hydrophilicity in the water-absorbing layer 11D is not limited to a step-by-step change. For example, in a water-absorbing layer of cellulose fibers, such as filter paper, the hydrophilicity can be enhanced by a plasma treatment. When the time that the filter paper is subject to a plasma treatment is increased gradually from the center toward the opening 8, a continuous hydrophilicity gradation can be formed in accordance with this embodiment.

Embodiment 4

FIG. 10 illustrates a fuel cell in this embodiment, which is a cross-sectional view in which the fuel cell in this embodiment is cut along a plane perpendicular to a plane including openings. Further, the fuel cells in this embodiment are stacked and connected similarly to those in Embodiment 1, whereby the fuel cell system of this embodiment can be assembled.

The first object of the water-absorbing layer 11 made of a hydrophilic water-absorbing material set in a supply path of oxygen is to prevent generated water from hindering the supply of oxygen. Therefore, it is desirable that the entire fuel cell system be configured so as to induce excessive generated water in the fuel cell to the water-absorbing layer 11.

In this embodiment, the oxygen supply layer 2 has through-holes 15, whereby excessive generated water in the fuel cell is induced to the water-absorbing layer 11. Embodiment 4 has the same configuration as that of Embodiment 2, except that the oxygen supply layer 2 has a through-hole.

The water generated by the power generation activity is accumulated not only in the oxygen supply layer 2, but also between the diffusion layer 3 and the membrane electrode assembly 4 to hinder the supply of oxygen to the membrane electrode assembly 4. By using a material having fine through-holes 15 as the oxygen supply layer 2, the generated water accumulated between the membrane electrode assembly 4 and the diffusion layer 3 can be sucked up to the contact surface between the oxygen supply layer 2 and the water-absorbing layer 11 by capillary action of the through-holes 15 of the oxygen supply layer 2. The thus sucked up water is absorbed by the water-absorbing layer 11 that is in contact with the oxygen supply layer 2.

With such a configuration, even when the thickness of the oxygen supply layer 2 in a direction parallel to the proton conduction direction is sufficiently large and the generated water cannot be absorbed only by capillary action of the water-absorbing layer 11, the generated water that inhibits the supply of oxygen can be discharged efficiently.

Embodiment 5

FIGS. 11 and 12 illustrate a fuel cell in this embodiment. FIG. 11 is a cross-sectional view in which the fuel cell in this embodiment is cut along a plane perpendicular to a plane including openings. Further, FIG. 12 is a cross-sectional view in which the fuel cell in this embodiment is cut along a plane parallel to a plane including openings. The fuel cells in this embodiment are stacked and connected similarly to those in Embodiment 1, whereby a fuel cell system in this embodiment can be assembled.

In this embodiment, a contact surface between the oxygen supply layer 2 and the collector 1 in Embodiment 2 has a plurality of grooves with a direction perpendicular to a plane including the openings being a length direction and the proton conduction direction being a depth direction. Further, a plurality of holes with a direction parallel to the proton conduction direction being a depth direction are formed in the oxygen supply layer 2. Then, a water-absorbing layer is placed at least in some of the grooves and the holes. Herein, the groove refers to the one in which the maximum length parallel to the proton conduction direction in a groove taken in a cross-section parallel to the proton conduction direction is smaller than the maximum length perpendicular to the proton conduction direction taken in a cross-section perpendicular to the proton conduction direction. The hole refers to the one in which the maximum length parallel to the proton conduction direction in a groove taken in a cross-section parallel to the proton conduction direction is larger than the maximum length perpendicular to the proton conduction direction taken in a cross-section perpendicular to the proton conduction direction. The holes may or may not pass through the oxygen supply layer 2. In the case where the holes pass through and are formed at a high density, any of the following two embodiments is preferable. Embodiment 1 is that at least partial holes among the plurality of holes do not have a water-absorbing layer over the entire region in the depth direction. Embodiment 2 is that the water-absorbing layer is formed only in some holes among the plurality of holes. The reason for this is as follows. When the area of a contact portion between the water-absorbing layer and the oxygen electrode side diffusion layer increases too much, the oxygen diffusion in the oxygen electrode and the diffusion layer may be inhibited. Specifically, assuming there is a contact plane between the water-absorbing layer and the oxygen supply layer, it is preferable that the area of the contact portion between the water-absorbing layer and the oxygen electrode side diffusion layer be 20% or less with respect to the area of the contact portion between the water-absorbing layer and the oxygen supply layer in the contact plane. In the present invention, it is assumed that "parallel" is a concept that includes being substantially parallel and is a range of ±10° in a parallel direction.

Further, it is preferable that the depth of the groove to be formed be 10% or more and 50% or less with respect to the thickness of the oxygen supply layer 2. Further, it is preferable that the length of the groove be the same as the distance between the end surface of the oxygen supply layer 2 present in a plane identical with that of the openings and the end surface of the oxygen supply layer 2 opposite to the above-mentioned end surface of the oxygen supply layer 2 present in a plane identical with that of the openings in the oxygen supply layer 2, in the case where the openings have a shape of a plane. The number of grooves to be formed can be adjusted by the amount of water generated by the power generation.

Further, a material for the water-absorbing layer placed in the grooves of the oxygen supply layer 2 may or may not be the same as a material for the water-absorbing layer placed in the holes. However, it is preferable that the water-absorbing layer placed in the grooves is connected to the water-absorbing layer placed in the holes.

The fuel cell in this embodiment is capable of efficiently absorbing water even in the case where the thickness of the oxygen supply layer 2 is sufficiently large. Thus, the fuel cell in this embodiment is preferably used in the case where the thickness of the oxygen supply layer 2 is even larger than that in Embodiment 4.

Embodiment 6

This embodiment provides a fuel cell with a configuration in which the end portion of the collector 1 in Embodiment 2 is present on the opposite side of the fuel cell with a plane including the openings 8 being a reference. That is, this embodiment provides a fuel cell with a configuration in which the collector 1, with which the water-absorbing layer 11 comes into contact, as well as the water-absorbing layer 11, is exposed to the outside of the fuel cell. Further, the fuel cells in this embodiment are stacked and connected similarly to those in Embodiment 1, whereby a fuel cell system in this embodiment can be assembled.

Figure 14:
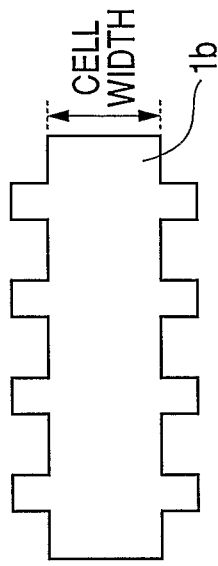
FIG. 14 is a cross-sectional view in which a collector in Embodiment 6 is cut along a plane perpendicular to a proton conduction direction.
Figure 15:
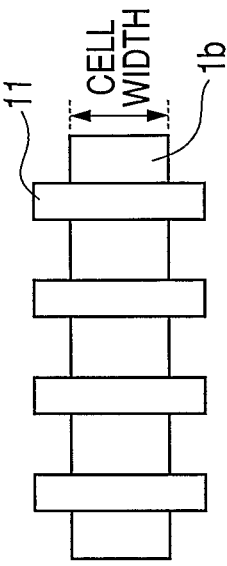
FIG. 15 is a projected view in which light is irradiated in a direction parallel to the proton conduction direction from an oxygen supply layer side to the collector and water-absorbing layer in Embodiment 6.
Figure 16:
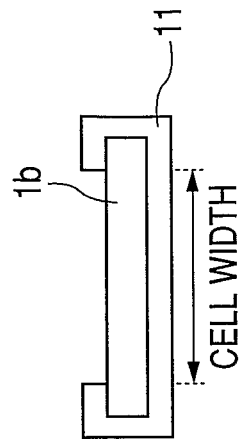
FIG. 16 is a projected view in which light is irradiated in a direction parallel to the proton conduction direction from an outside of the fuel cell to the collector and water-absorbing layer in Embodiment 6.

FIGS. 13 to 16 illustrate the fuel cell in this embodiment. FIG. 13 is a cross-sectional view in which the fuel cell in this embodiment is cut along a plane perpendicular to a plane including openings. FIG. 14 is a cross-sectional view in which the collector 1a is cut along a plane perpendicular to the proton conduction direction. FIG. 15 is a projected view in which light is irradiated to the collector 1a and the water-absorbing layer 11 in a direction parallel to the proton conduction direction from the oxygen supply layer 2 side when the collector 1a and the water-absorbing layer 11 of FIG. 14 are incorporated in a fuel cell. Further, FIG. 16 is a projected view in which light is irradiated to the collector 1a and the water-absorbing layer 11 in a direction parallel to the proton conduction direction from outside of the fuel cell on the opposite side of the oxygen supply layer 2 when the collector 1 is assumed to be a reference.

In this embodiment, in a cross-section in a direction perpendicular to the proton conduction direction, the length of the collector in a direction perpendicular to a plane including openings is larger than the length of the fuel cell (the width of the collector is larger than a cell width of the fuel cell). The collector and the water-absorbing layer are in contact with each other outside of the cell. Thus, even in a high-humidity environment in which transpiration is difficult to perform, transpiration can be promoted efficiently using the heat of the collector generated at the power generation. That is, the discharge performance can be enhanced.

As represented by 1a of FIG. 14, the collector can be shaped in such a manner that the length of the collector in a direction perpendicular to the plane including openings is larger than the length (cell width) of the fuel cell in a direction perpendicular to the plane including the openings.

A plurality of water-absorbing layers may be placed as described in Embodiment 2, or the water-absorbing layer 11 may have a ladder shape as illustrated in FIG. 15.

In the case where the collector has a shape as illustrated in FIG. 14, the water-absorbing layer can be placed over the entire collector, so that more water-absorbing material can be placed, which makes it easy to miniaturize the cell.

Embodiment 7

A fuel cell in this embodiment has the same configuration as that in Embodiment 6, except that the shapes of the collector and the water-absorbing layer are different. Further, the fuel cells in this embodiment are also stacked and connected similarly to those in Embodiment 1, whereby the fuel cells in this embodiment can be assembled.

Figure 17:
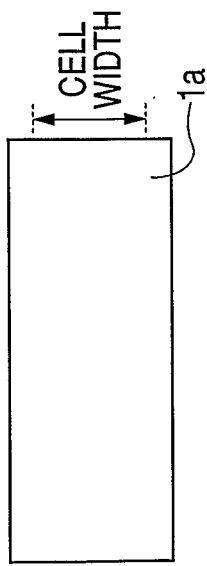
FIG. 17 is a cross-sectional view in which a collector in Embodiment 7 is cut along a plane perpendicular to a proton conduction direction.
Figure 18:
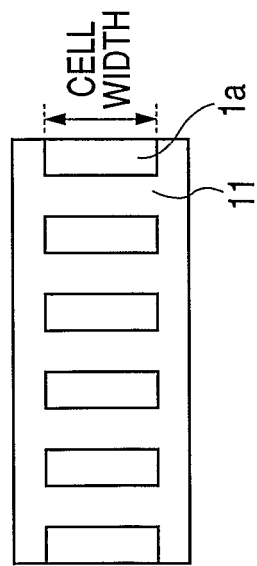
FIG. 18 is a projected view in which light is irradiated in a direction parallel to the proton conduction direction from an oxygen supply layer side to the collector and water-absorbing layer in Embodiment 7.
Figure 19:
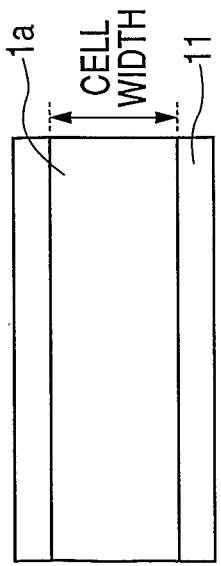
FIG. 19 is a cross-sectional view in which the collector and water-absorbing layer in Embodiment 7 are cut along the plane perpendicular to the plane including the openings.

FIG. 17 is a cross-sectional view in which the shape of the collector in this embodiment is cut along a plane perpendicular to the proton conduction direction. FIG. 18 is a projected view in which light is irradiated in a direction parallel to the proton conduction direction from an oxygen supply layer side to the collector and the water-absorbing layer in Embodiment 7. Further, FIG. 19 is a cross-sectional view in which the water-absorbing layer and the collector in this embodiment are cut along a plane perpendicular to a plane including openings.

The collector and the water-absorbing layer in this embodiment have a comb shape, as illustrated in FIGS. 17 and 18. In the comb-shaped collector in this embodiment, only a comb portion is exposed to the outside from the side surface of the fuel cell. In the case where the collector 1b is a comb-shaped collector, it is preferable that the width and length of the comb be the same as those of the water-absorbing layer exposed to the outside of the cell. Also, as illustrated in FIG. 19, it is preferable that a plurality of water-absorbing layers cover each tooth end portion of the comb-shaped collector.

In this embodiment, compared with Embodiment 6, there is an advantage that the performance is enhanced due to the easy intake of air. Thus, in the case where cell performance is more important that the miniaturization of the cell, a fuel cell with a configuration in this embodiment is preferred.

As described above, by setting the configuration of a fuel cell as in Embodiments 1 to 7, even when a current per unit surface area of the membrane electrode assembly 4 is set to be high, a local flooded region of the membrane electrode assembly 4 is unlikely to be formed, and stable high power generation efficiency is maintained. Thus, using the membrane electrode assembly 4 with a small area, a large current can be output even without depending upon a circulation mechanism and an atmospheric blower. Thus, the present invention provides an inexpensive highly reliable small-sized and light-weight fuel cell system that has fewer parts and exhibits a long useful life and excellent performance.

Fuel Cell in Comparative Embodiments

Next, fuel cells in Comparative Embodiments will be described.

Comparative Embodiment 1

FIG. 20 is a cross-sectional view in which a conventional passive solid polymer fuel cell, which is Comparative Embodiment 1, is cut along a plane parallel to a plane including openings. FIG. 21 is a cross-sectional view in which the conventional passive fuel cell, which is Comparative Embodiment 1, is cut along a plane perpendicular to a plane including openings. As illustrated in FIG. 20, the fuel cell 100S of the solid polymer fuel cell includes at least a membrane electrode assembly 104, diffusion layers 103 and 105, a fuel supply flow path (fuel supply layer) 106, an oxygen supply flow path (oxygen diffusion layer) 102, and separators 101 and 107. The membrane electrode assembly 104 includes an electrolyte film and a catalyst layer (fuel electrode and oxygen electrode). The membrane electrode assembly 104 is placed in a center portion of the fuel cell 100S. A catalyst layer that is an oxygen electrode is present on one surface of the electrolyte film. Another catalyst layer that is a fuel electrode is present on the other surface of the electrolyte film. The diffusion layer 105 is present at a position opposite to the electrolyte film, with the fuel electrode interposed therebetween. The diffusion layer 103 is present at a position opposite to the electrolyte film on an outer side of the catalyst layer that is an oxygen electrode. The fuel electrode and the oxygen electrode, respectively, play a role in allowing fuel or an oxidizer to diffuse outside and in generating electrons. The oxygen supply layer 102 and the fuel supply layer 106, which are supply flow paths for supplying the fuel or oxidizer to the entire fuel cell 100S, are present on an outer side of the diffusion layers 103 and 105.

A porous medium having conductivity is used as a member for the diffusion layers 103 and 105. An example of the conductive porous medium includes carbon cloth. Nothing is placed in the oxygen supply layer 102 and the fuel supply layer 106. A highly porous medium is set as a collecting and a supporting member.

The fuel moves in the fuel supply layer 106 due to the forceful circulation, for example, by a pump. The oxidizer moves in the oxygen supply layer 102 by a procedure such as natural diffusion and natural convection. The oxidizer and the fuel diffuse from the oxygen supply layer 102 and the fuel supply layer 106 through the diffusion layers 103 and 105 and, respectively, reach the electrolyte film in the membrane electrode assembly 104.

In the contact portion between the fuel electrode and the electrolyte film in the membrane electrode assembly 104, the fuel that reached the fuel electrode is oxidized by an oxidation action due to a catalyst to generate hydrogen ions and move in the electrolyte film toward a cathode. This fuel can be, for example, a gas, such as hydrogen, or a liquid, such as methanol and ethanol.

In the contact portion between the oxygen electrode and the electrolyte film in the membrane electrode assembly 104, the oxidizer (e.g., oxygen) that moved from the oxygen supply layer 102 through the diffusion layer 103 and the hydrogen ions that moved in the electrolyte film react with each other to generate water molecules. Then, a part of the energy generated in a series of chemical reactions is taken out as electric energy.

As described above, in the cathode of the membrane electrode assembly 104, water is generated by the power generation reaction. The water generally becomes water vapor or generated water to move from the diffusion layer 103 to the oxygen supply layer 102 and is discharged from the openings 108 due to transpiration. The water may also be discharged from an anode side after passing through the electrolyte film. At this time, in the case where the fuel is supplied with a pump, the water also moves together with the fuel as it is due to the pressure of the pump and is discharged from a discharge port.

As illustrated in FIG. 21, in a fuel cell 100S of a conventional passive fuel cell system, the electrolyte film is placed at the center. Then, a catalyst layer is formed on both the front and back surfaces of the electrolyte film to serve as the membrane electrode assembly 104. On an outer side of the membrane electrode assembly 104, the diffusion layers 103 and 105 are present. The diffusion layer 105 is supplied with hydrogen as fuel. The diffusion layer 103 is supplied with atmospheric oxygen as an oxidizer. Since the anode side is supplied with hydrogen, it is sealed with the separators 107 and 109 so that leakage does not occur. Further, the cathode side has the opening 108 so as to be supplied with air.

The generated water becomes water vapor to diffuse naturally and is discharged to the atmosphere through the openings 108. Alternatively, the generated water is liquefied in the diffusion layer 103 and the supply layer 102 and is accumulated. In particular, the water liquefied inside the diffusion layer 103 and the oxygen supply layer 102 continues to accumulate at the positions until it is evaporated for discharge. Therefore, when left, the water has an effect on the supply of oxygen to the cathode.

In a passive type fuel cell, there is no means for sending out water discharged to the oxygen supply layer 102. Thus, once the water is discharged from the diffusion layer 103 to the oxygen supply layer 102, it continues to be accumulate at that position as it is and finally stops the supply of an oxidizer. Thus, when the fuel cell that does not have a discharge unit is driven for a long period of time, its performance deteriorates.

Comparative Embodiment 2

Further, FIG. 22 is a cross-sectional view in which a conventional passive solid polymer fuel cell 100s, which is Comparative Embodiment 2, is cut along a plane perpendicular to a plane including openings. Although the fuel cell in this comparative embodiment has the water-absorbing layer 110 between the oxygen supply layer 102 and the diffusion layer 103 in Comparative Embodiment 1, the end surface of the water-absorbing layer is present on a cell side with respect to the plane identical with the openings 108, i.e., in the cell. In FIG. 22, only right and left ends 108 on the drawing surface of the fuel cell are openings.

In the case where the end portions of the water-absorbing layer are present in the cell, as in this comparative embodiment, since the amount of water generated immediately after the commencement of power generation is small, the generated water is absorbed by the water-absorbing layer. However, since the end portions of the water-absorbing layer in this comparative embodiment are present in the cell and do not come into contact with air outside the cell, the transpiration of the water absorbed by the water-absorbing layer is poor. Thus, in the case where the amount of generated water is large, e.g., in the case where driving is performed for a long period of time, the water-absorbing layer cannot absorb all the water, and the generated water accumulates. As a result, the supply of an oxidizer becomes insufficient, and the performance of a fuel cell and a fuel cell system using the fuel cells deteriorates.

Comparative Embodiment 3

FIG. 23 is a cross-sectional view in which a conventional passive solid polymer fuel cell 100s, which is Comparative Embodiment 3, is cut along a plane perpendicular to a plane including openings. Each of a fuel cell system and a fuel cell in this comparative embodiment is a fuel cell with a configuration in which the water-absorbing layer 110 is provided between the oxygen supply layer 102 and the diffusion layer 103 in Comparative Embodiment 1.

In the case where the water-absorbing layer is formed between the oxygen supply layer and the oxygen electrode side diffusion layer, instead of between the oxygen supply layer and the collector as in this embodiment, the water-absorbing layer 110 inhibits the diffusion of oxygen taken in by the fuel cell through the openings 108 to the diffusion layer 103. Because the diffusion of oxygen to the diffusion layer 103 is inhibited, the supply of oxygen to the membrane electrode assembly 104 is also inhibited and the performance of the fuel cell deteriorates.

Next, specific examples will be described in detail based on the above-mentioned embodiments. It should be noted that the materials for the catalyst layer (oxygen electrode and fuel electrode), the electrolyte film, the diffusion layer, the oxygen supply layer, and the fuel supply layer are not limited to the following Any material may be used, so long it has similar functions.

EXAMPLE 1

This example provides a fuel cell in which an absorbing layer is formed on the surface of an oxygen supply layer on a collector side and an end portion of the water-absorbing layer is present on an opposite side of the fuel cell, with a plane including openings being a reference. Hereinafter, production processes of the fuel cell according to this example will be described in detail.

Process 1

A platinum oxide catalyst having a dendrite structure was formed so as to have a thickness of 2,000 nm by reactive sputtering on a PTFE sheet (Nitfron produced by Nitto Denko Corporation) as a transcription layer to an electrolyte film. The Pt carrying amount at this time was 0.68 mg/cm². The reactive sputtering was performed under the conditions of a total pressure of 4 Pa, an oxygen flow ratio ($Q_{O2}/(Q_{Ar}+Q_{O2})$) of 70%, a substrate temperature of 300° C., and a switch power of 4.9 W/cm². Continuously, the platinum oxide catalyst having a dendrite structure was subjected to a reducing treatment at 120° C. for 30 minutes in a 2% $H_2$/He atmosphere (1 atm), whereby a platinum catalyst layer with a dendrite structure was obtained on the PTFE sheet.

Further, the above-mentioned PTFE sheet was impregnated with a mixed suspension solution of the PTFE and Nafion (registered trademark), whereby an electrolyte channel was formed effectively on the surface of the catalyst and an appropriate water-repellent treatment was conducted.

Process 2

A platinum carrying carbon catalyst is formed on a PTFE sheet as a transcription layer to an electrolyte film using a doctor blade. A catalyst slurry used herein is a kneaded substance of platinum-carrying carbon (HiSPEC 4000 produced by Johnson Matthey Inc.), Nafion, PTFE, IPA, and water. The platinum-carrying amount at this time was 0.35 mg/cm².

Process 3

Using the catalyst layer produced in Process 1 as an oxygen electrode and the catalyst layer produced in Process 2 as a fuel electrode, a solid polymer electrolyte film (Nafion 112 produced by DuPont Corp.) was sandwiched by the above-mentioned pair of catalyst layers (an oxygen electrode and a fuel electrode). The resultant stack was subjected to hot pressing under the press conditions of 8 MPa, 150° C., and 1 min.

The PTFE sheet was peeled to transcribe the pair of catalyst layers to the polymer electrolyte film to connect the electrolyte film to the pair of catalyst layers, whereby a membrane electrode assembly (MEA) was obtained.

Process 4

Foam metal with a length of 28 mm, a width of 10 mm, and a thickness of 2 mm was used as an oxygen supply layer. A plate with a length of 37 mm and a width of 10 mm was used as an end plate. The length and width of this plate were set to be those of a cell. Four grooves having a length of 10 mm, a width of 2.5 mm, and a depth of 500 μm were formed on one surface of the oxygen supply layer, i.e., on a side in contact with an oxygen electrode side collector at an equal interval in a direction parallel to the width of 10 mm of the oxygen supply layer. A water-absorbing material cut to a length of 2 cm, a width of 2.5 mm, and a thickness of 500 μm was placed in each groove so as to extend out from the cell by 5 mm each on the right and left sides to form a water-absorbing layer. Herein, liquid diffusion non-woven fabric (P type produced by ANBIC Co., Ltd.) was used as the water-absorbing material. As a result, the water-absorbing layer 11 and the oxygen supply layer 2 were obtained.

Process 5

An assembly of the MEA obtained as described above, the oxygen supply layer, the water-absorbing layer, a fuel electrode side collector, a fuel electrode side diffusion layer, an oxygen electrode side diffusion layer, and an oxygen electrode side collector were stacked as illustrated in FIG. 2 to obtain a fuel cell. The fuel electrode side collector in this example corresponds to a separator 7 of FIG. 2. Further, carbon cloth (LT2500-W produced by E-TEK Inc.) was used for the fuel electrode side diffusion layer and carbon cloth (LT1200-W produced by E-TEK Inc.) was used for the oxygen electrode side diffusion layer.

FIGS. 24A to 24C illustrate the water-absorbing layers 11 and the oxygen supply layer 2 produced in Process 4. FIG. 24A is a cross-sectional view in which the water-absorbing layer and the oxygen supply layer are cut along a plane parallel to openings. FIG. 24B is a projected view in which light is irradiated to the water-absorbing layer and the oxygen supply layer from the collector side in a direction parallel to the proton conduction direction. FIG. 24C is a projected view in which light is irradiated to the water-absorbing layer and the oxygen supply layer from the oxygen electrode side diffusion layer side in a direction parallel to the proton conduction direction.

EXAMPLE 2

This example provides a fuel cell system in which a water-absorbing layer is placed only between the oxygen supply layer and the collector described in the embodiments and an end portion of the water-absorbing layer is present on a plane including openings. That is, the end portion of the water-absorbing layer is present on a plane identical with a plane including the openings. The structure in Example 2 is the same as that in Example 1, except for this point. FIGS. 25A to 25C illustrate the water-absorbing layer 11 and the oxygen supply layer 2 thus produced. FIG. 25A is a cross-sectional view in which the water-absorbing layer and the oxygen supply layer are cut along a plane parallel to a plane including openings. FIG. 25B is a projected view in which light is irradiated to the water-absorbing layer and the oxygen supply layer from the collector side in a direction parallel to the proton conduction direction. FIG. 25C is a projected view in which light is irradiated to the water-absorbing layer and the oxygen supply layer from the oxygen electrode side diffusion layer side in a direction parallel to the proton conduction direction.

Flooding resistance characteristics were evaluated based on a fluctuation of a voltage measured at a constant current of 400 mA/cm$^2$ of the fuel cell produced as described above. The flooding resistance characteristics were evaluated by natural aspiration without using an auxiliary appliance, such as a compressor, under the following measurement conditions. The cell was placed in a constant temperature and constant humidity tank in a windless state at a temperature of 25° C. and a humidity of 50%. Further, at this time, the fuel cell produced as in Comparative Example 1 using the same processes, except that the water-absorbing layer was not formed, was similarly evaluated.

Figure 26:
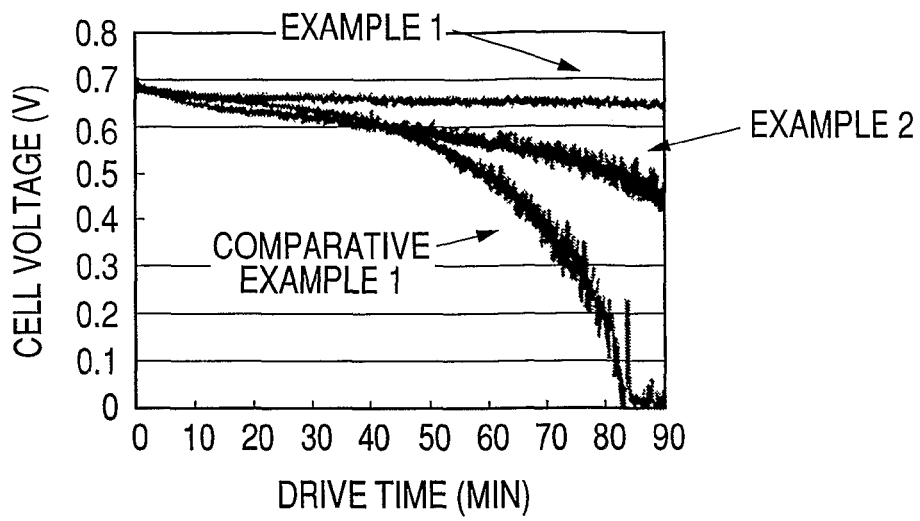
FIG. 26 is a graph illustrating the performance of the fuel cells in Example 1, Example 2, and Comparative Example 1.

FIG. 26 illustrates the evaluation results of the fuel cells of Example 1, Example 2, and Comparative Example 1. There was no difference in voltage at the commencement of the measurement. The deterioration in performance caused by forming the water-absorbing layer was not recognized. The reason for this is assumed to be as follows. Since the water-absorbing layer is not in contact with the diffusion layer on the oxygen electrode side, the water-absorbing layer does not inhibit the diffusion of gas. However, the difference in voltage between Example 1 and Comparative Example 1 increases gradually 20 minutes after the commencement of measurement, and a large difference was generated after 90 minutes elapsed.

Next, the amounts of water remaining in the fuel cells were compared after 90 minutes of the measurement at a constant current elapsed. Consequently, the weight of the water remaining in the cell in Comparative Example 1 was 0.2852 g, whereas the weight of the water remaining in the cell in Example 1 exhibited a smaller value of 0.1265 g.

It is understood from those results that the fuel cell in Example 1 discharged generated water to the outside of the cell and suppressed flooding.

Furthermore, the amount of the water remaining in the cell in Example 2 was 0.1798 g. Thus, even in the cell of Example 2, the amount of remaining water was smaller than that in Comparative Example 1. That is, it is understood that the discharge function in the embodiment mode of Example 2 is higher than that in the embodiment mode of Comparative Example 1.

The discharge function in the embodiment mode of Example 1 is even greater than that in the embodiment mode of Example 2, so that the embodiment mode in Example 1 is preferable in the case of obtaining a higher discharge function. On the other hand, in the embodiment mode of Example 2, the water-absorbing layer is small, so that a cell structure that is more compact than that in the embodiment mode of Example 1 can be obtained. Thus, it is preferable that the embodiment mode of Example 1 be used for an application in which the emphasis is placed on the discharge function and the embodiment mode in Example 2 be used for an application in which the emphasis is placed on space efficiency while maintaining a discharge function.

As described above, by forming a water-absorbing layer on the surface of the oxygen supply layer on the collector side, flooding resistance characteristics were enhanced remarkably without causing a decrease in performance.

EXAMPLE 3

This example is an example in which water-absorbing layers are placed between an oxygen supply layer and a collector and in the oxygen supply layer, respectively. This example is very effective in the case where the oxygen supply layer is thicker and water vapor generated from the diffusion layer becomes water droplets in the oxygen supply layer before reaching the collector. The processes other than Process 4 are the same as those in Example 1, so that only Process 4 will be described.

Process 4 (Processes 1 to 3, and 5 are the Same as Those in Example 1)

Four grooves with a length of 10 mm, a width of 2.5 mm, and a depth of 500 μm were formed on the surface of the oxygen supply layer on the collector (oxygen electrode side collector) side at an equal interval. Two non-through holes of 2 mmϕ were formed at an equal interval with respect to one groove at a portion where the grooves were formed. The non-through holes were filled with a water-absorbing material to form a water-absorbing layer. The water-absorbing material cut to a length of 2 cm, a width of 2.5 mm, and a thickness of 500 μm was set in the grooves to form another water-absorbing layer. At this time, the water-absorbing material present in the non-through holes and the water-absorbing material in the grooves were placed so as to come into contact with each other. FIGS. 27A to 27D illustrate the water-absorbing layer 11 and the oxygen supply layer 2. At this time, foam metal used for the oxygen supply layer was set to have a length of 28 mm, a width of 10 mm, and a thickness of 2 mm in the same way as in Example 1. Further, a cell size was set to be 37 mm×10 mm. Water-absorbing fibers were placed in a short direction so as to extend out by 5 mm on the right and left sides.

Figure 27A:
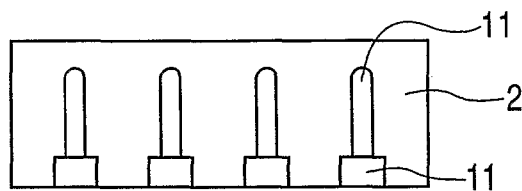
FIGS. 27A, 27B, 27C, and 27D are views illustrating water-absorbing layers and an oxygen supply layer in Example 3.
Figure 27B:
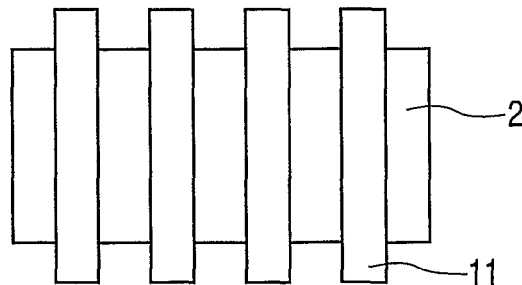
Figure 27C:
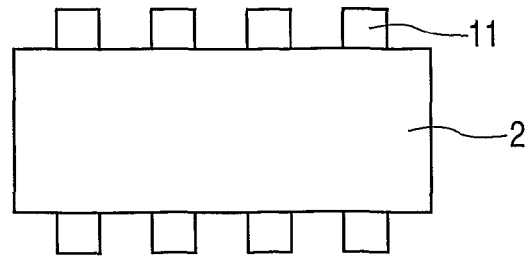
Figure 27D:
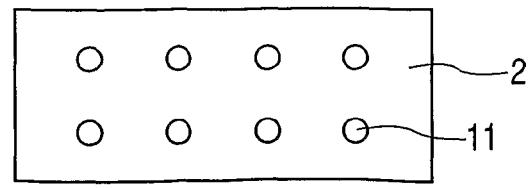

FIG. 27A is a cross-sectional view in which the water-absorbing layer and the oxygen supply layer are cut along a plane parallel to a plane including openings. FIG. 27B is a projected view in which light is irradiated to the water-absorbing layer and the oxygen supply layer from the collector side in a direction parallel to the proton conduction direction. FIG. 27C is a projected view in which light is irradiated to the water-absorbing layer and the oxygen supply layer from the oxygen electrode side diffusion layer side in a direction parallel to the proton conduction direction. FIG. 27D is a cross-sectional view in which the oxygen supply layer and the water-absorbing layer placed in the holes of the oxygen supply layer are cut along a plane perpendicular to the proton conduction direction.

Flooding resistance characteristics were evaluated based on a fluctuation of a voltage measured at a constant current of 400 mA/cm$^2$ of the fuel cell produced as described above. The flooding resistance characteristics were evaluated by natural aspiration without using an auxiliary appliance, such as a compressor, under the following measurement conditions. The cell was placed in a constant temperature and constant humidity tank in a windless state at 25° C. and a humidity of 50%. At this time, the fuel cell in Comparative Example 1 was similarly evaluated.

Figure 28:
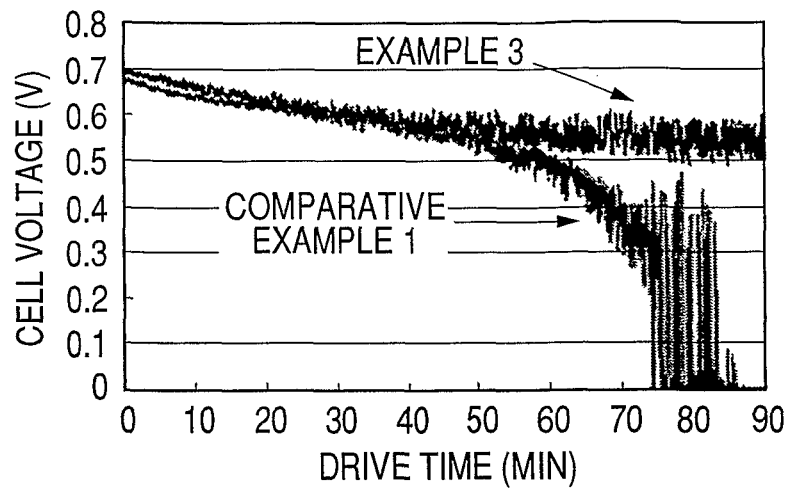
FIG. 28 is a graph illustrating the performance of the fuel cells in Example 3 and Comparative Example 1.

FIG. 28 illustrates the results. There was no difference in voltage at the commencement of the measurement in Example 3 and Comparative Example 1, so that it is understood that a decrease in gas diffusion caused by the water-absorbing layer did not occur. In the same way as in FIG. 26, the difference in voltage between Example 3 and Comparative Example 1 increased gradually 20 minutes after the commencement of the measurement and a large difference occurred after 90 minutes elapsed.

Next, the amounts of water remaining in both of the cells were compared after 90 minutes of the measurement at a constant current elapsed, whereby the discharge functions were compared. Consequently, the weight of the water remaining in the cell in Comparative Example 1 was 0.2394 g, whereas the weight of the remaining water in the cell in Example 3 was 0.1338 g, which is a remarkably small amount. It is understood from those results that the fuel cell in Example 3 discharged generated water out of the cell and prevented the flooding phenomenon.

Next, the superiority of the presence of the end portion of the water-absorbing layer on a plane identical with a plane including openings, or the presence of the end portion on the opposite side of the fuel cell with the plane including openings being a reference, and the superiority of the presence of the water-absorbing layer between the collector and the oxygen supply layer will be shown. In order to show the superiority, the configuration in which the end portion of the water-absorbing layer is in the cell is set to be Comparative Example 2 and the configuration in which the water-absorbing layer is present between the oxygen supply layer and the oxygen electrode side diffusion layer is set to be Comparative Example 3, both of which were compared with each other.

COMPARATIVE EXAMPLE 2

This comparative example provides the case where, although the water-absorbing layer is placed between the oxygen supply layer and the collector in the same way as in Example 1, the water-absorbing layer does not extend out from the cell and an end portion of the water-absorbing layer is placed on the same side as that of the fuel cell with a plane including openings being a reference. The processes other than Process 4 are the same as those in Example 1, so that only Process 4 will be described.

Process 4 (Processes 1 to 3, and 5 are the Same as Those in Example 1)

Figure 29A:
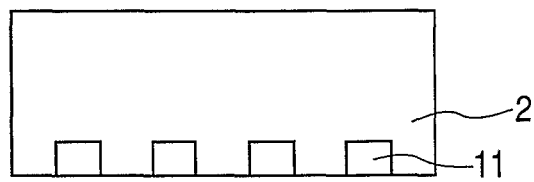
FIGS. 29A, 29B, and 29C are views illustrating water-absorbing layers and an oxygen supply layer in Comparative Example 2.
Figure 29B:
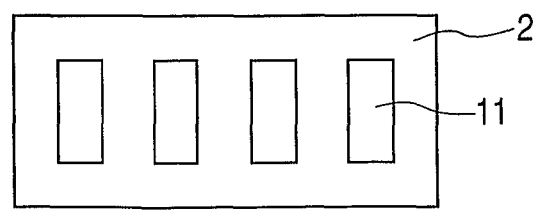
Figure 29C:

On the surface of the oxygen supply layer on the collector side, four grooves each having a length of 10 mm, a width of 2.5 mm, and a depth of 500 μm are formed at an equal interval in parallel to the width of 10 mm of the oxygen supply layer. A water-absorbing material cut to a length of 5 mm, a width of 2.5 mm, and a thickness of 500 μm is set in each groove so that the end portion of the water-absorbing layer is placed on the same side as that of the fuel cell with a plane including openings being a reference. FIGS. 29A to 29C illustrate the water-absorbing layer 11 and the oxygen supply layer 2 thus formed. FIG. 29A is a cross-sectional view in which the water-absorbing layer and the oxygen supply layer are cut along a plane parallel to a plane including openings. FIG. 29B is a projected view in which light is irradiated to the water-absorbing layer and the oxygen supply layer from the collector side in a direction parallel to the proton conduction direction. FIG. 29C is a projected view in which light is irradiated to the water-absorbing layer and the oxygen supply layer from the oxygen electrode side diffusion layer side in a direction parallel to the proton conduction direction.

The fuel cell produced as described above was set to be Comparative Example 2 and compared with Example 1 for flooding resistance characteristics. The flooding resistance characteristics were evaluated based on a fluctuation of a voltage measured at a constant current of 400 mA/cm$^2$. The flooding resistance characteristics were evaluated by natural aspiration without using an auxiliary appliance, such as a compressor, under the following measurement conditions. The cell was placed in a constant temperature and constant humidity tank in a windless state at 25° C. and a humidity of 50%.

Figure 30:
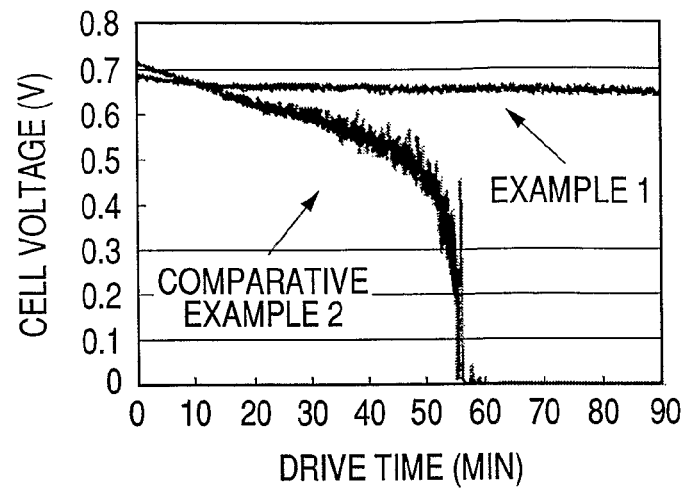
FIG. 30 is a graph illustrating the performance of the fuel cells in Example 1 and Comparative Example

FIG. 30 illustrates the results. In the configuration of Comparative Example 2, a decrease in voltage occurred after the elapse of about 60 minutes. Further, the weight of the water remaining in the cell in Example 1 after the elapse of about 90 minutes from the constant current measurement was 0.1265 g, whereas the weight was 0.209 g in Comparative Example 2. Based the above-mentioned results, in the configuration in Comparative Example 2, it is presumed that the discharge of generated water was low, which caused a decrease in voltage caused by flooding. The reason for this is considered as follows. Since the end portion of the water-absorbing layer is in the cell, the generated water absorbed by the water-absorbing layer accumulated in the oxygen supply layer without evaporating and clogged the oxygen supply layer. Thus, it was shown that even when the water-absorbing layer is formed between the oxygen supply layer and the collector, a sufficient discharge effect is not exhibited in the case where the end portion of the water-absorbing layer is in the cell.

COMPARATIVE EXAMPLE 3

This comparative example provides a fuel cell system with a configuration in which although the end portion of the water-absorbing layer is present on an opposite side of the fuel cell with a plane including openings being a reference, the water-absorbing layer is placed between the oxygen supply layer and the oxygen electrode side diffusion layer. The processes other than Process 4 are the same as those in Example 1, so that only Process 4 will be described.

Process 4 (Processes 1 to 3, and 5 are the Same as Those in Example 1)

Foam metal with a length of 28 mm, a width of 10 mm, and a thickness of 2 mm was used as the oxygen supply layer 2.

Figure 31A:
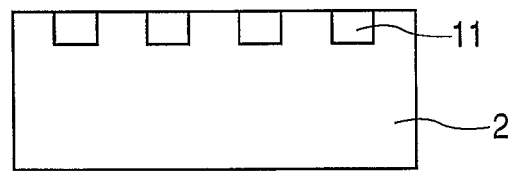
FIGS. 31A, 31B, and 31C are views illustrating water-absorbing layers and an oxygen supply layer in Comparative Example 3.
Figure 31B:
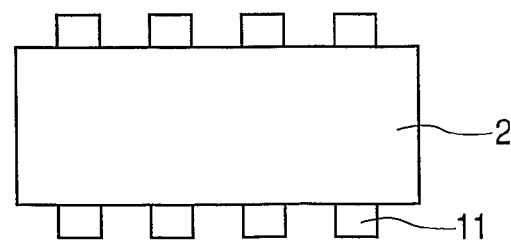
Figure 31C:
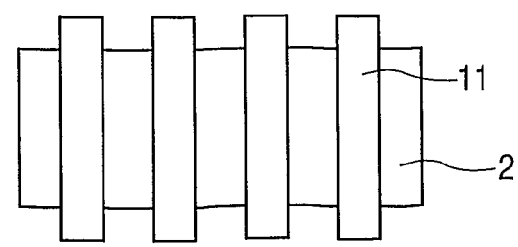

On the surface of the oxygen supply layer 2 on the oxygen electrode side diffusion layer 3 side, four grooves with a length of 10 mm, a width of 2.5 mm, and a depth of 500 μm were formed at an equal interval in a direction parallel to the width of the oxygen supply layer 2. The water-absorbing layer cut to a length of 2 cm, a width of 2.5 mm, and a thickness of 500 μm was set in each groove and the end portions of the water-absorbing layer were set so as to extend out by 5 mm on the right and left sides from the cell in such a manner that the end portion of the water-absorbing layer was present on an opposite side of the fuel cell with a plane including openings being a reference. An end plate with a length of 37 mm and a width of 10 mm was used. The length and the width were set to be those of the cell. FIGS. 31A to 31C illustrate the water-absorbing layer 11 and the oxygen supply layer 2 thus obtained. FIG. 31A is a cross-sectional view in which the water-absorbing layer and the oxygen supply layer are cut along a plane parallel to a plane including openings. FIG. 31B is a projected view in which light is irradiated to the water-absorbing layer and the oxygen supply layer from the collector side in a direction parallel to the proton conduction direction. FIG. 31C is a projected view in which light is irradiated to the water-absorbing layer and the oxygen supply layer from the oxygen electrode side diffusion layer side in a direction parallel to the proton conduction direction.

The fuel cell in Comparative Example 3 produced as described above was compared with the fuel cell in Example 1 for performance, whereby flooding resistance characteristics were evaluated. Flooding resistance characteristics were evaluated based on a fluctuation of a voltage measured at a constant current of 400 mA/cm$^2$. Further, by comparing the I-V characteristics, the cell characteristics of both of the cells were compared with each other. The flooding resistance characteristics were evaluated by natural aspiration without using an auxiliary appliance, such as a compressor, under the following measurement conditions. The cell was placed in a constant temperature and constant humidity tank in a windless state at 25° C. and a humidity of 50%.

Figure 32:
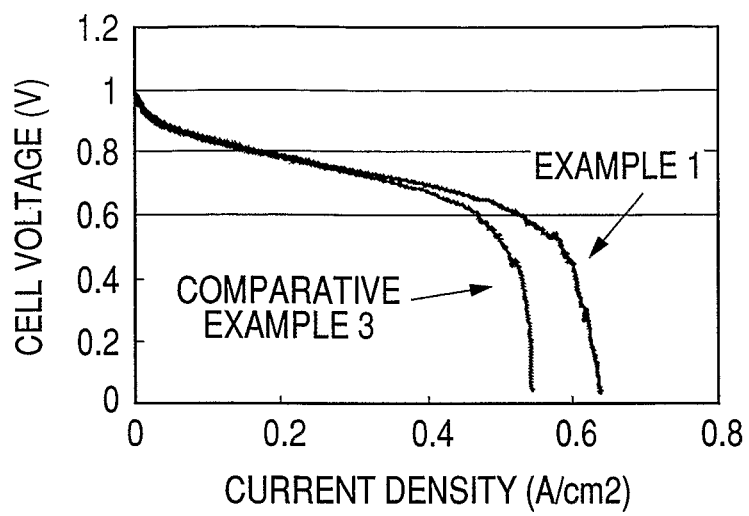
FIG. 32 is a graph illustrating the performance of the fuel cells in Example 1 and Comparative Example 3.

FIG. 32 illustrates I-V curves in Example 1 and Comparative Example 3. When both were compared, substantially the same characteristics were exhibited in a low-current region, whereas a difference was found in a high-current region of 500 mA/cm$^2$ or more and a difference was observed even at a limiting current. This is considered to have been caused as follows. In the fuel cell in Comparative Example 3, since the water-absorbing layer with a low diffusion of air is present in a wide region between the oxygen supply layer and the oxygen electrode side diffusion layer, a small amount of air is supplied to the catalyst layer and a decrease in performance occurs particularly in a high-current region.

Figure 33:
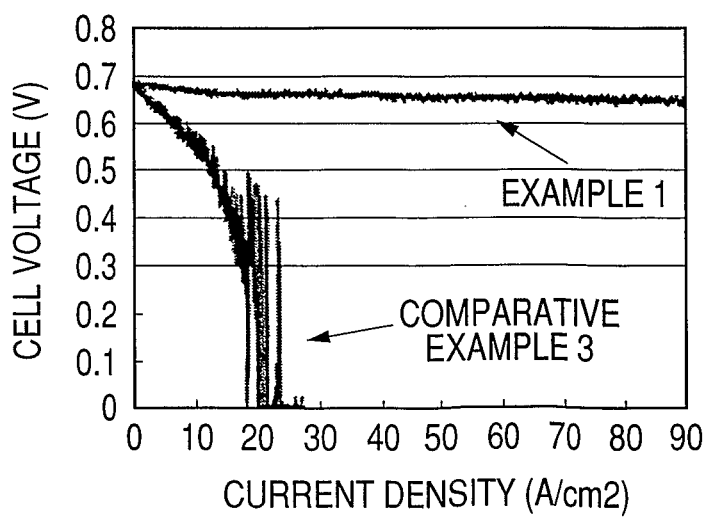
FIG. 33 is a graph illustrating the performance of the fuel cells in Example 1 and Comparative Example 3.

Next, FIG. 33 illustrates a fluctuation in voltage during a constant current measurement in a comparison between the flooding resistance characteristics in Example 1 and in Comparative Example 3. In Comparative Example 3 that provides a cell with a configuration in which the water-absorbing layer is placed between the oxygen supply layer and the oxygen electrode side diffusion layer, a decrease in voltage was observed in a short period of time. However, when the amounts of water remaining in both of the cells after the elapse of 90 minutes from the constant current measurement were compared with each other, the weight was 0.1265 g in the cell of Example 1, whereas the weight was 0.129 g in the cell of Comparative Example 3. Thus, it is understood that even the configuration of Comparative Example 3 has a high discharge ability equal to that of Example 1. The factor for the observation of a decrease in voltage irrespective of the high discharge ability is considered as follows. Since the water-absorbing layer is placed in a wide region between the oxygen supply layer and the oxygen electrode side diffusion layer, the generated water in the oxygen supply layer is drawn in the oxygen electrode side diffusion layer, and the water in the oxygen supply layer can be discharged efficiently. However, the oxygen electrode side diffusion layer was submerged in water. As a result, a decrease in voltage caused by the flooding of the oxygen electrode side diffusion layer instead of the oxygen supply layer was observed.

Thus, it is understood that when the fuel cell is placed, the water-absorbing layer in which an area of a plane cut along a plane perpendicular to the proton conduction direction is large needs to be formed between the oxygen supply layer and the collector.

Next, an example will be described, which has a configuration in which the end portion of the collector is present on an opposite side of the fuel cell with a plane including openings being a reference and the water-absorbing layer and the collector are in contact with each other outside the cell. That is, the example provides a fuel cell in which the end portion of the collector is present on an opposite side of the cell with a plane including openings being a reference and at least a part of a region present on an opposite side of the fuel cell is in contact with the water-absorbing layer with a plane including the openings in the collector being a reference. Hereinafter, a state in which the end portion of the collector is present on an opposite side of the fuel cell with a plane including openings being a reference may be referred to as a state in which the collector extends out from the cell. A portion present on an opposite side of the fuel cell with a plane including the openings in the collector being a reference may be referred to as a portion extending out from the cell.

EXAMPLE 4

In this example, the collector has a comb shape, the comb portion is present on an opposite side of the cell with a plane including openings being a reference, and the collector is in contact with the water-absorbing layer in a portion present on an opposite side of the cell with the openings being a reference, i.e., in the comb portion. The width and length of the comb are the same as those of the portion present on an opposite side of the cell with the openings being a reference and only the collector in the portion that is in contact with the water-absorbing layer outside of the cell extends out from the cell. Example 4 is the same as Example 1, except that the collector has a comb shape, the end portion thereof is outside the cell, and the collector is in contact with the water-absorbing layer outside the cell. The length of the collector extending out from the cell was set to be 2 mm on the right and left sides.

EXAMPLE 5

In this example, the end portion of the collector has a linear shape, the end portion in a liner shape is present on an opposite side of the cell with a plane including openings being a reference, and a portion present on an opposite side of the cell is in contact with the water-absorbing layer with the openings of the collector being a reference. Example 5 is the same as Example 1, except that the entire collector extends out from the cell and the water-absorbing layer and the collector are in contact with each other even outside the cell.

The length of the collector extending out from the cell was set to be 1 mm on the right and left sides.

Figure 34A:
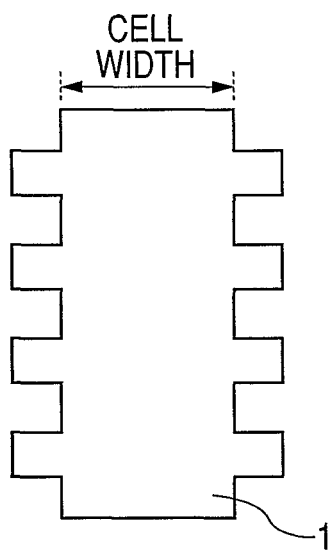
FIGS. 34A, 34B, 34C, and 34D are views illustrating a collector and water-absorbing layers in Example 4.
Figure 34B:
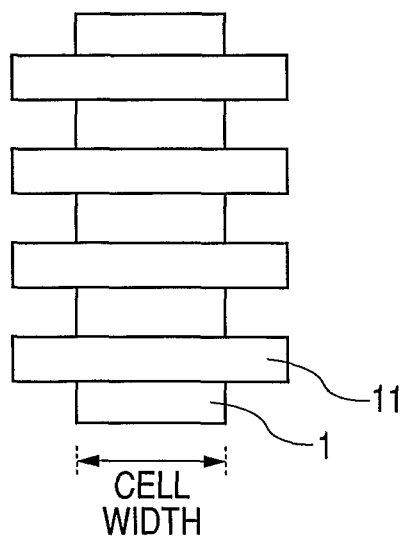
Figure 34C:
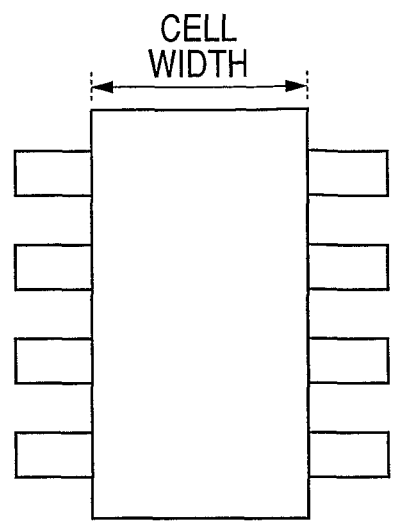
Figure 34D:
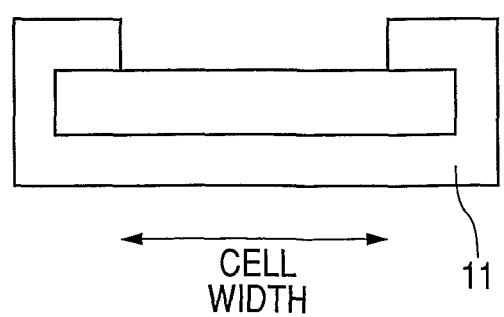

FIGS. 34A to 34D illustrate the water-absorbing layer 11 and the collector 1 in Example 4. FIG. 34A is a cross-sectional view of the collector cut along a plane perpendicular to the proton conduction direction. FIG. 34B is a projected view in which light is irradiated to the water-absorbing layer and the collector from the oxygen supply layer side in a direction parallel to the proton conduction direction. FIG. 34C is a projected view in which light is irradiated to the water-absorbing layer and the collector from an opposite side of the water-absorbing layer with the collector being a reference in a direction parallel to the proton conduction direction. FIG. 34D is a cross-sectional view in which the water-absorbing layer and the collector are cut along a plane perpendicular to a plane including the openings.

Figure 35A:
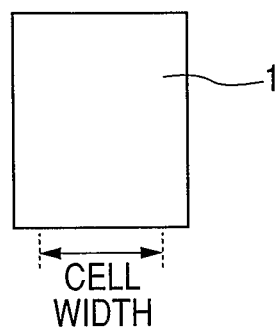
FIGS. 35A, 35B, 35C, and 35D are views illustrating a collector and water-absorbing layers in Example 5.
Figure 35B:
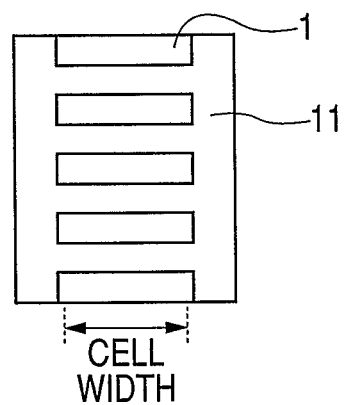
Figure 35C:
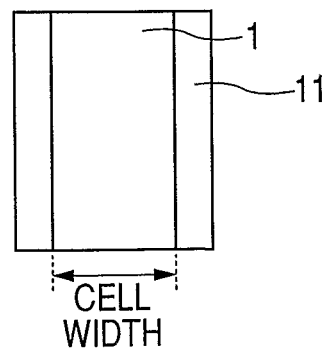
Figure 35D:
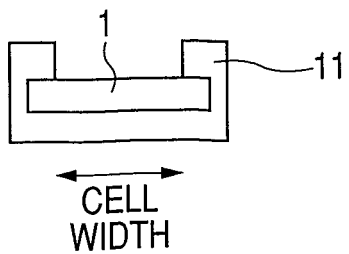

Further, FIGS. 35A to 35D illustrate the water-absorbing layer 11 and the collector 1 in Example 5. FIG. 35A is a cross-sectional view in which the collector is cut along a plane perpendicular to the proton conduction direction. FIG. 35B is a projected view in which light is irradiated to the water-absorbing layer and the collector from the oxygen supply layer side in a direction parallel to the proton conduction direction. FIG. 35C is a projected view in which light is irradiated to the water-absorbing layer and the collector from an opposite side of the water-absorbing layer with the collector being a reference in a direction parallel to the proton conduction direction. FIG. 35D is a cross-sectional view in which the water-absorbing layer and the collector are cut along a plane perpendicular to a plane including the openings.

As illustrated in FIGS. 34A to 34D and 35A to 35D, the width of the collector in each of Examples 4 and 5 is larger than that of the cell. The collector extends out from the cell and is in contact with the water-absorbing layer not only in the cell, but also outside the cell. At this time, as illustrated in FIGS. 34D and 35D, when the water-absorbing layer is placed so as to be wound around the extending portion, the amount of the water-absorbing layer that can be placed is doubled with the same level of extension, whereby space efficiency is enhanced. Further, in the case where the entire collector in Example 5 illustrated in FIG. 35A extends out, the extending portion is not in a band shape as in Examples 1 to 4, and the water-absorbing layer can be placed in a ladder shape over the entire extending portions of the collector, so that space efficiency can be further enhanced.

Figure 36:
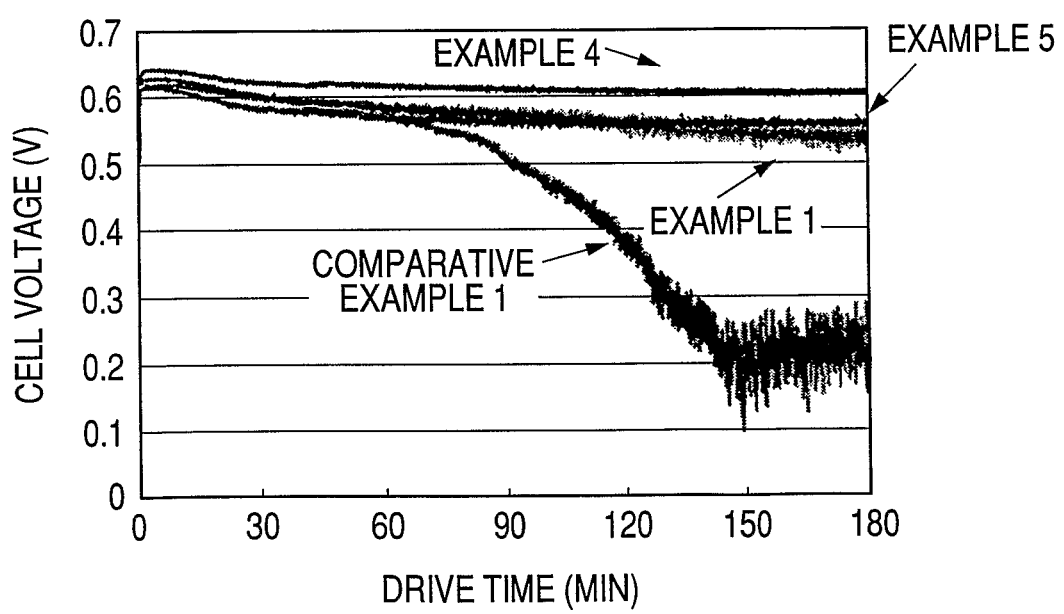
FIG. 36 is a graph illustrating the performance of the fuel cells in Example 1, Example 4, Example 5, and Comparative Example 1.

In the case where the collector is allowed to extend out from the cell and the water-absorbing layer and the collector are brought into contact with each other even outside the cell, there is an advantage in that the space efficiency is enhanced as described above and heat generated during power generation can be supplied to the water-absorbing layer. That is, by supplying heat to the water-absorbing material of the water-absorbing layer, the evaporation is enhanced and the characteristics are expected to be enhanced particularly in a high humidity environment in which evaporation is mode difficult to perform. At this time, it is more preferable to fix the extending portion of the collector and the water-absorbing layer with a heat-conductive double-sided tape, because heat can be supplied more efficiently. In order to confirm the above-mentioned effects, flooding resistance characteristics in a high humidity environment were evaluated by performing measurement at a constant current of 400 mA/cm$^2$ by natural aspiration without using an auxiliary appliance, such as a compressor, under the following measurement conditions. The cells in Examples 1, 4, and 5, and Comparative Example 1 were placed in a constant temperature and constant humidity tank at 25° C. in a 90% atmosphere. FIG. 36 illustrates the results.

In the fuel cell that has no absorbing layer in Comparative Example 1, voltage decreased largely due to the flooding, whereas the cells in Examples 1, 4, and 5 did not show a decrease in voltage and exhibited high flooding resistance characteristics. Further, when the amounts of water remaining in the cells were compared with each other based on the changes in cell weights before and after the measurement, the water amount was 0.234 g in Comparative Example 1, and the water amount was 0.237 g in Example 1. Further, in Example 1, an initial voltage was 0.635 V, whereas the voltage was 0.537 V when the measurement was completed. Thus, a decrease in voltage of 0.116 V, i.e., 18.3% was confirmed.

In contrast, the amounts of water remaining in the cells in Examples 4 and 5 were 0.148 g and 0.144 g, respectively. The initial voltage was 0.648 V in Example 4, whereas the voltage was 0.608 V when the measurement was completed. Thus, a decrease in voltage was limited to 0.04 V, i.e., 6.2%. Further, in Example 5, the initial voltage was 0.621 V, whereas the voltage was 0.561 V when the measurement was completed. Thus, a decrease in voltage was limited to 0.06 V, i.e., 9.7%.

From the above-mentioned results, it can be considered to be preferable to form the water-absorbing layers with a higher discharge ability as in Examples 4 and 5, although there is such an effect even in the cell with a configuration as in Example 1 in a high humidity environment, such as in a 90% humidity atmosphere at 25° C. The reason for this is as follows. Since the ability of water to evaporate from the water-absorbing layer decreases in a high humidity environment, the collector extends out from the cell and the water-absorbing layer and the collector are brought into contact with each other even in the extending portion, as in Examples 4 and 5, whereby the evaporation of water in the water-absorbing layer can be promoted using the heat generated by power generation.

Example 4 exhibits a higher voltage than that in Example 5. This is considered to be due to the collector having a comb shape. In the case where the entire collector extends out as in Example 5, the collector plays a roll of a hood, which inhibits the diffusion of the gas, and the characteristics may be degraded. In contrast, in the case of Example 4, since the collector has a comb shape, gas is supplied from between the extending portions, i.e., between the tooth portions, whereby the inhibition of the diffusion of the gas can be minimized. In the case of Example 5, the entire collector extends out, whereby the area where the water-absorbing layer is placed can have a large size. That is, the extension for placing the same amount of the water-absorbing layer may be smaller than that in Example 4. Although Examples 4 and 5 have the same discharge ability, the extending amount of the collector is smaller in Example 4 than in Example 5, whereby a more compact cell can be obtained. That is, the fuel cell with the configuration of Example 4 can be appropriately selected in an application in which the emphasis is placed on the characteristics and the fuel cell with the configuration of Example 5 can be appropriately selected in the application in which the emphasis is placed on a cell size.

This application claims priority from Japanese Patent Application No. 2006-027793, filed Feb. 3, 2006, which is hereby incorporated by reference herein.

The invention claimed is:

1. A fuel cell comprising:
a power generation layer member for moving hydrogen ions from one surface to another surface, and causing the hydrogen ions to react with oxygen on the another surface;
an oxygen supply layer having a porosity of at least 80% for diffusing oxygen in an atmosphere taken in from a side surface to supply the oxygen to the another surface;
a diffusion layer between the power generation layer member and the oxygen supply layer;
a current collector; and
a water-absorbing layer between the oxygen supply layer and the current collector,
wherein the side surface is a surface which is parallel to a direction of movement of an H ion in power generation,
wherein the water-absorbing layer has an ability to hold liquid water that is higher than that of the oxygen supply layer, is communicated with the oxygen supply layer, and is placed opposed to the power generation layer member with at least the oxygen supply layer between the water-absorbing layer and the diffusion layer,
wherein the water-absorbing layer is not in contact with the diffusion layer,
wherein at least a part of the water-absorbing layer is directly opened to an atmosphere outside of the oxygen supply layer, and
wherein supply of oxygen from the side surface from which oxygen is taken in to the power generation layer member depends upon natural diffusion of oxygen through the oxygen supply layer without using a fan.

2. The fuel cell according to claim 1, wherein:
the water-absorbing layer is a sheet-shaped member made of a material different from that of the oxygen supply layer; and
the material for the water-absorbing layer has hydrophilicity higher than that of the material for the oxygen supply layer.

3. The fuel cell according to claim 2, wherein air permeability of the oxygen supply layer in a direction communicating the power generation layer member with the water-absorbing layer is higher than that in a direction along a surface of the power generation layer member.

4. The fuel cell according to claim 3, wherein:
an average pore size of the diffusion layer is smaller than that of the oxygen supply layer and larger than that of the power generation layer member; and
a number of through-holes communicating the oxygen supply layer with the power generation member are formed in the diffusion layer.

5. The fuel cell according to claim 1, wherein the water-absorbing layer at a plane position close to the side surface from which oxygen is taken in has a stability for holding liquid water higher than that at a plane position away from the side surface from which oxygen is taken in.

6. A fuel cell comprising an electrolyte film, a catalyst layer, two diffusion layers, a fuel supply layer, an oxygen supply layer, a water-absorbing layer, and a collector, wherein:
the fuel cell has an opening at least in a part of a side surface parallel to a proton conduction direction of the electrolyte film among side surfaces of the fuel cell;
one of the two diffusion layers is present between the electrolyte film and the oxygen supply layer;
the oxygen supply layer is present between the water-absorbing layer and the one of the two diffusion layers;
the water-absorbing layer is present between the oxygen supply layer and the collector;
the water-absorbing layer is not in contact with the one of the two diffusion layers; and
an end portion of the water-absorbing layer is present on one of a plane including the opening and an opposite side of the fuel cell with the plane including the opening being a reference,
wherein oxygen is taken in through a surface of the oxygen supply layer, which said surface is parallel to the proton conduction direction of the electrolyte film, and the oxygen taken in through the surface of the oxygen supply layer is supplied to the one of the two diffusion layers by natural diffusion through the oxygen supply layer, and
wherein at least a part of the water-absorbing layer is directly opened to an atmosphere outside of the oxygen supply layer.

7. The fuel cell according to claim 6, wherein:
the water-absorbing layer includes a plurality of regions each having hydrophilicity different from that of a different region; and
the hydrophilicity is higher in a region closer to the opening among the plurality of regions.

8. The fuel cell according to claim 6, wherein:
the oxygen supply layer has a groove on a surface thereof in a the collector side; and
at least a part of the water-absorbing layer is present in the groove.

9. The fuel cell according to claim 6, wherein the oxygen supply layer has a plurality of holes, and each of the holes has a depth direction that is parallel to the proton conduction direction.

10. The fuel cell according to claim 9, wherein the water-absorbing layer is present in the holes.

11. The fuel cell according to claim 10, wherein the water-absorbing layer present between the oxygen supply layer and the collector is connected to the water-absorbing layer present in the holes.

12. The fuel cell according to claim 6, wherein:
an end portion of the collector extends outside of the fuel cell with the plane including the opening being a reference; and
at least a part of a region present on an opposite side of the fuel cell with the plane including the opening in the collector being a reference is in contact with the water-absorbing layer.

13. The fuel cell according to claim 12, wherein the collector has a comb shape.

14. A fuel cell system comprising a fuel cell stack, wherein:
the fuel cell stack comprises a plurality of fuel cells; and
at least one of the fuel cells is a fuel cell according to claim 6.

* * * * *